United States Patent [19]
Greenewald et al.

[11] Patent Number: 5,610,813
[45] Date of Patent: Mar. 11, 1997

[54] THUNDERSTORM CELL DETECTION AND MAPPING SYSTEM FOR IDENTIFYING AND RANGING THUNDERSTORM CELLS BY CLUSTERING SINGLE STRIKE LIGHTNING OBSERVATIONS

[75] Inventors: John H. Greenewald, Columbus; Randolph L. Moses, Worthington, both of Ohio

[73] Assignee: B. F. Goodrich FlightSystems, Inc., Akron, Ohio

[21] Appl. No.: 319,194

[22] Filed: Oct. 6, 1994

[51] Int. Cl.[6] .................................................. G06F 19/00
[52] U.S. Cl. ............................................................ 364/420
[58] Field of Search ............................ 364/420; 324/72, 324/460

[56] References Cited

U.S. PATENT DOCUMENTS

| | | | |
|---|---|---|---|
| 3,638,882 | 2/1972 | Turriere | 244/158 R |
| 4,023,408 | 5/1977 | Ryan et al. | 73/170 R |
| 4,672,305 | 6/1987 | Coleman | 324/72 |
| 4,803,421 | 2/1989 | Ostrander | 324/72 |
| 4,996,473 | 2/1991 | Markson et al. | 324/72 |
| 5,036,334 | 7/1991 | Henderson et al. | 342/460 |
| 5,111,400 | 5/1992 | Yoder | 364/424.01 |
| 5,245,274 | 9/1993 | Youngquist | 324/72 |
| 5,295,071 | 3/1994 | Kuzma et al. | 364/420 |

OTHER PUBLICATIONS

Hans Volland, "CRC Handbook of Atmospherics", vol. 1, pp. 190–199.

B. M. Stevens, Jr. et al., "A Lightning Data Acquisition System", Jun. 24–26, 1986, International Aerospace and Ground Conference on Lightning and Static Electricity, Dayton, Ohio.

U.S. patent application Ser. No. 08/274,924 filed Jul. 13, 1994 entitled Lightning Strike Detection and Mapping System.

U.S. patent application Ser. No. 08/319,364 filed Oct. 6, 1994 entitled Statistically–Based Thunderstorm Cell Detection and Mapping System.

*Primary Examiner*—Donald E. McElheny, Jr.
*Attorney, Agent, or Firm*—William E. Zitelli; Mark D. Saralino

[57] ABSTRACT

A thunderstorm cell detection and mapping system which includes means for acquiring lightning strike information relating to locations of respective lightning strikes, and means for identifying and locating active thunderstorm cells based on the lightning strike information.

32 Claims, 18 Drawing Sheets

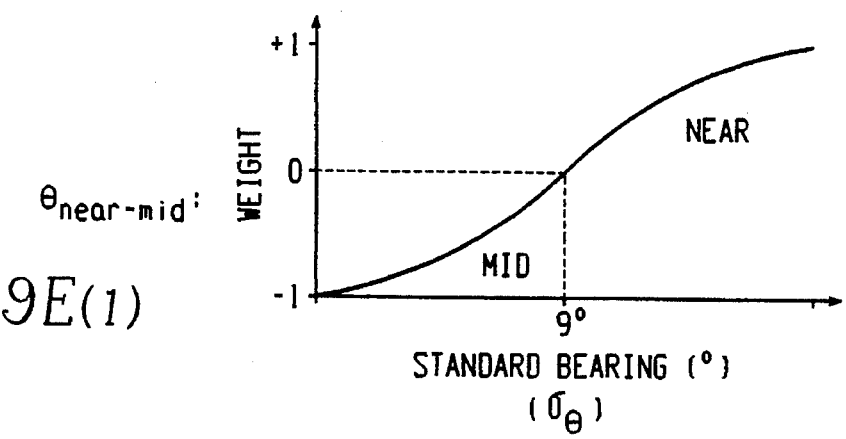
Fig. 9E(1)
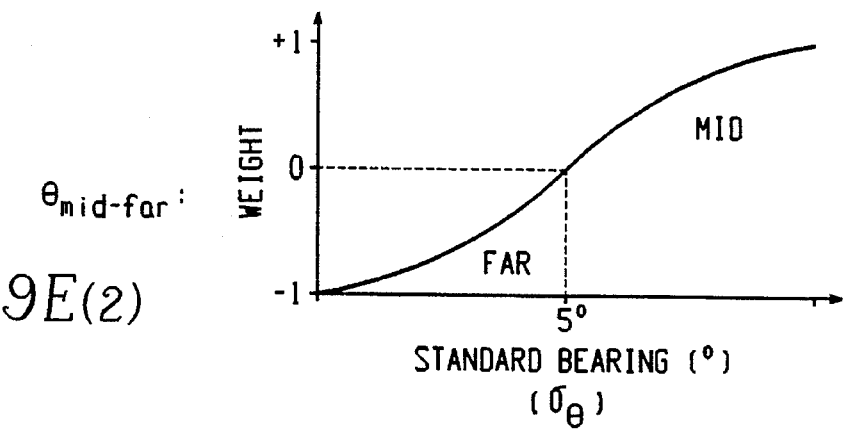
Fig. 9E(2)
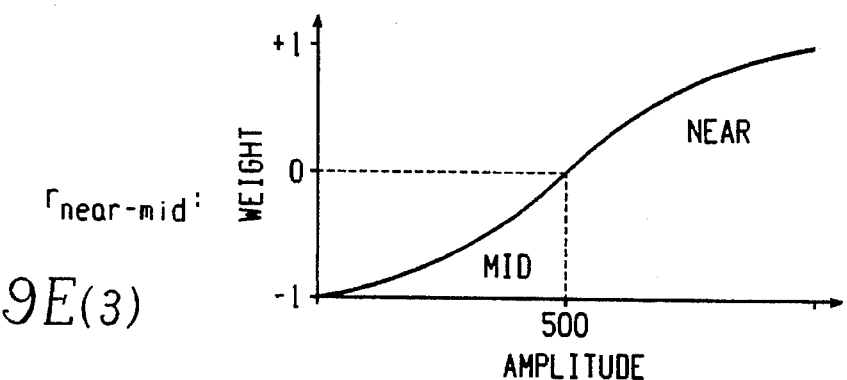
Fig. 9E(3)
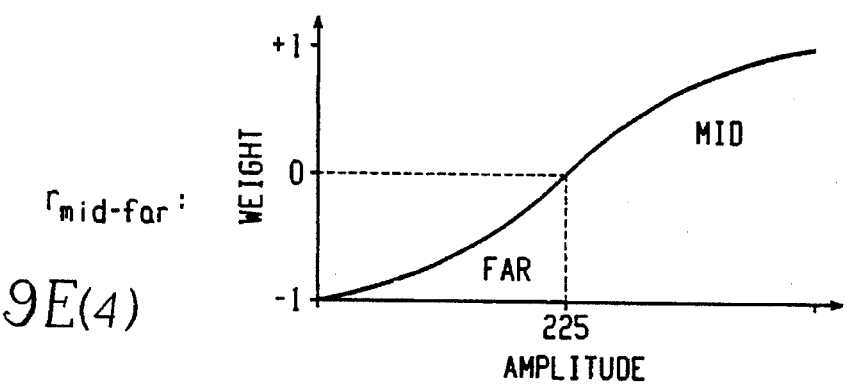
Fig. 9E(4)

THUNDERSTORM CELL DETECTION AND MAPPING SYSTEM FOR IDENTIFYING AND RANGING THUNDERSTORM CELLS BY CLUSTERING SINGLE STRIKE LIGHTNING OBSERVATIONS

CROSS REFERENCE TO RELATED APPLICATION

This invention is related to the invention described in U.S. Patent Application Ser. No. 08/319,364, to R. L. Moses, filed on the same date as the present application and entitled "Statistically-Based Thunderstorm Cell Detection and Mapping System", issued as U.S. Pat. No. 5,528,494, on Jun. 18, 1996, the entire disclosure of which is incorporated herein by reference.

TECHNICAL FIELD

The present invention relates generally, as is indicated, to a thunderstorm cell detection and mapping system. In particular, the present invention relates to a system for clustering lightning strike data to identify active thunderstorm cells and to estimate the location of such thunderstorm cells.

BACKGROUND OF THE INVENTION

It is well known that thunderstorms present a serious threat to airborne craft as a result of the dangerous turbulence, up and down drafts, wind shear and other violent atmospheric disturbances generated thereby. Thunderstorms for the most part are comprised of clusters of cells which grow and dissipate within the storm through a variety of stages. Most of the violent lightning occurs coincidentally with the violent atmospheric disturbances during the mature stage of the storm cells. This strong correlation between the threatening atmospheric disturbances and electrical discharges was used by Ryan to create a weather mapping system known as Stormscope®, which was disclosed in the U.S. Pat. No. 4,023,408 and which is currently assigned to the same assignees as the instant application.

The Ryan system is capable of measuring pulse type electromagnetic radiation generated through the atmosphere from the large electric currents flowing within the lightning channel during a lightning stroke for the detection thereof. Ryan's system used an inverse relationship of the measured radiation to map the detected lightning strike on a display in range and bearing relative to an observation location which, for example, may be the location of the aircraft. In one embodiment, the observation location was calibrated at the center of the display screen and each displayed stroke appeared as a substantial point source at a bearing and radial dimension from the screen center, the radial dimension being proportional to the range measurement of the corresponding lightning stroke. The dimension between the displayed stroke and screen center was not necessarily a measure of the actual range from the aircraft to the stroke but rather an approximation of range based on a mix of distance and intensity information of the detected lightning stroke.

In addition, a U.S. Patent bearing the number U.S. Pat. No. 4,672,305 and issued to Coleman is directed to a lightning detection system which uses a ratio of low (1.5 kHz) and high (500 kHz) frequency magnetic field components to extend the range thereof. Further, U.S. Pat. No. 4,803,421, and its divisional counterpart U.S. Pat. No. 4,873,483, both issued to Ostrander and assigned to the same assignee as the instant application, are directed to lightning detection and mapping systems which determine lightning locations from the ratio of the integrated intensity of two different field components of lightning generated signals. Also, a data acquisition system for use in gathering lightning strike data is present in the paper "A Lightning Data Acquisition System", authorized by B. M. Stevens, Jr. et al. for the International Aerospace and Ground Conference on Lightning and Static Electricity at Dayton, Ohio, Jun. 24–26, 1986.

Another U.S. Patent bearing the number U.S. Pat. No. 5,295,071 and currently assigned to the same assignee as the present application, uses a filter-based method for estimating the location of the lightning strike. The lightning strike signal is passed through a series of narrow-band filters and the filter outputs are used to determine the range and bearing of the lightning strike.

Although each of the systems discussed above offers significant advantages in the detection and mapping of lightning strikes, there remains areas for improvement. For example, many of these systems estimate the location of each lightning strike based on single-strike processing algorithms, i.e., processing which determines the location of a strike independent of the location estimates for other detected strikes. An area for improvement is a system which clusters the individual strikes into thunderstorm cells so that the overall cells may be ranged. Specifically, an area for improvement is a system in which the location of thunderstorm cells may be ascertained based on a history of lightning strikes. The location of the respective thunderstorm cells can then be displayed representing clusters of individual lightning strikes. Such a display provides a clear indication of the location of the thunderstorm cells.

SUMMARY OF THE INVENTION

According to the present invention, a system is provided for detecting and mapping thunderstorm cells. The system detects groups of one or more individual lightning strikes and calculates a number of parameters based thereon. The system initially stores the parameters relating to each group of lightning strikes in what is referred to herein as a strike matrix. Thunderstorm cells are represented in the system by a corresponding cell matrix which includes information relating to lightning strikes which have been linked to that particular thunderstorm cell. The lightning strikes included in the strike matrix are linked to a thunderstorm cell matrix as a function of the parameters of the strikes in the strike matrix compared to those in the cell matrix.

In particular, each strike matrix is assigned what is referred to herein as a confidence label. The confidence label is determined based on the parameters in the strike matrix including for example, the strike amplitude and frequency content. The confidence label provides an indication of the likelihood that strikes included in the strike matrix originated from a location considered near to the system origin, far from the system origin, or somewhere in the middle. Similarly, each thunderstorm cell matrix includes a cell matrix label derived from the parameters stored therein which provides an indication as to whether the thunderstorm cell represented by the cell matrix is located near the system origin, far from the system origin, or somewhere in the middle. The system compares the confidence label of the strike matrix with the label of the respective cell matrices according to a predetermined criteria to determine whether the strikes in the strike matrix can be properly added to those in a given cell matrix. The system then estimates and displays the range and bearing of the thunderstorm cells represented by the respective cell matrices based on the strikes included therein.

In accordance with one particular aspect of the invention, a thunderstorm cell detection and mapping system is provided, including means for acquiring lightning strike information relating to locations of respective lightning strikes, and means for identifying and locating active thunderstorm cells based on the lightning strike information.

In accordance with another aspect of the invention, a thunderstorm cell detection and mapping system is provided including means for acquiring lightning strike data relating to locations of respective lightning strikes, strike matrix means for grouping the lightning strikes into a plurality of groups based on the lightning strike data, and for each of the groups forming a strike matrix including strike matrix data representative of the lightning strikes included in the group, cell matrix means for forming a plurality of cell matrices, each cell matrix being representative of an active thunderstorm cell and including cell matrix data representative of lightning strikes associated with the active thunderstorm cell, matching means for attempting to match each of the strike matrices with one of the cell matrices according to a predetermined criteria, and if the match is successful, for associating the lightning strikes represented by the strike matrix with the matching cell matrix, and means for estimating locations for each of the active thunderstorm cells based on the cell matrix data included in the respective cell matrices.

In accordance with yet another aspect of the present invention, a thunderstorm cell detection and mapping system is provided including means for receiving signals related to locations of lightning strikes, means for processing the signals to detect lightning flashes occurring among the lightning strikes, and means for estimating locations of different active thunderstorm cells based on the detected lightning flashes.

In accordance with another aspect of the present invention, a system for identifying a merger of a plurality of active thunderstorm cells is provided including means for acquiring lightning strike data representative of respective lightning strikes, means for processing the lightning strike data to obtain data representative of locations of respective active thunderstorm cells, means for comparing the data representative of the location of one of the active thunderstorm cells with the data representative of the location of another of the active thunderstorm cells according to a predetermined criteria, and means for identifying the one active thunderstorm cell and the another active thunderstorm cell as being part of a same active thunderstorm cell based on the comparison.

In accordance with yet another aspect of the present invention, a thunderstorm cell detection and mapping system with invalid data rejection capabilities is provided including means for receiving lightning strike data representative of a detected lightning strike, means for associating the detected lightning strike with an existing active thunderstorm cell in the event a first predetermined criteria is satisfied, the first predetermined criteria being based on a comparison of the lightning strike data representative of the detected lightning strike with other lightning strike data representative of lightning strikes previously associated with the active thunderstorm cell, means for associating the detected lightning strike with a new active thunderstorm cell in the event a second predetermined criteria is satisfied, and means for rejecting the lightning strike data representative of the detected lightning strike as being invalid in the event neither the first nor second criteria is satisfied.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 9E represents weighting curves for establishing near-mid and mid-far crossover weights for updating the label of the cell matrix in accordance with the present invention.

DESCRIPTION OF THE PREFERRED EMBODIMENTS

The present invention will now be described in detail with reference to the drawings wherein like reference labels are used to refer to like elements throughout. The present invention is designed to detect the electro-magnetic fields associated with individual lightning strikes and to process the information obtained from such fields in order to develop a set of strike parameters in a strike matrix indicative of the location of the lightning strikes. In the preferred embodiment, the system accumulates the lightning strikes in the strike matrix on the basis of originating from the same lightning flash. The system proceeds to combine the strikes in the strike matrix with one of a plurality of thunderstorm cell matrices based on the confidence label of the strike matrix in relation to the cell matrix. Each cell matrix forms a queue of strike parameters for multiple lightning strikes associated with the thunderstorm cell. The system can then estimate the range and bearing of each thunderstorm cell based on the strike information stored in the respective cell matrix, and proceeds to display such information. As a result, the system provides a display of the thunderstorm cells detected within the range of the system.

Figure 1A:
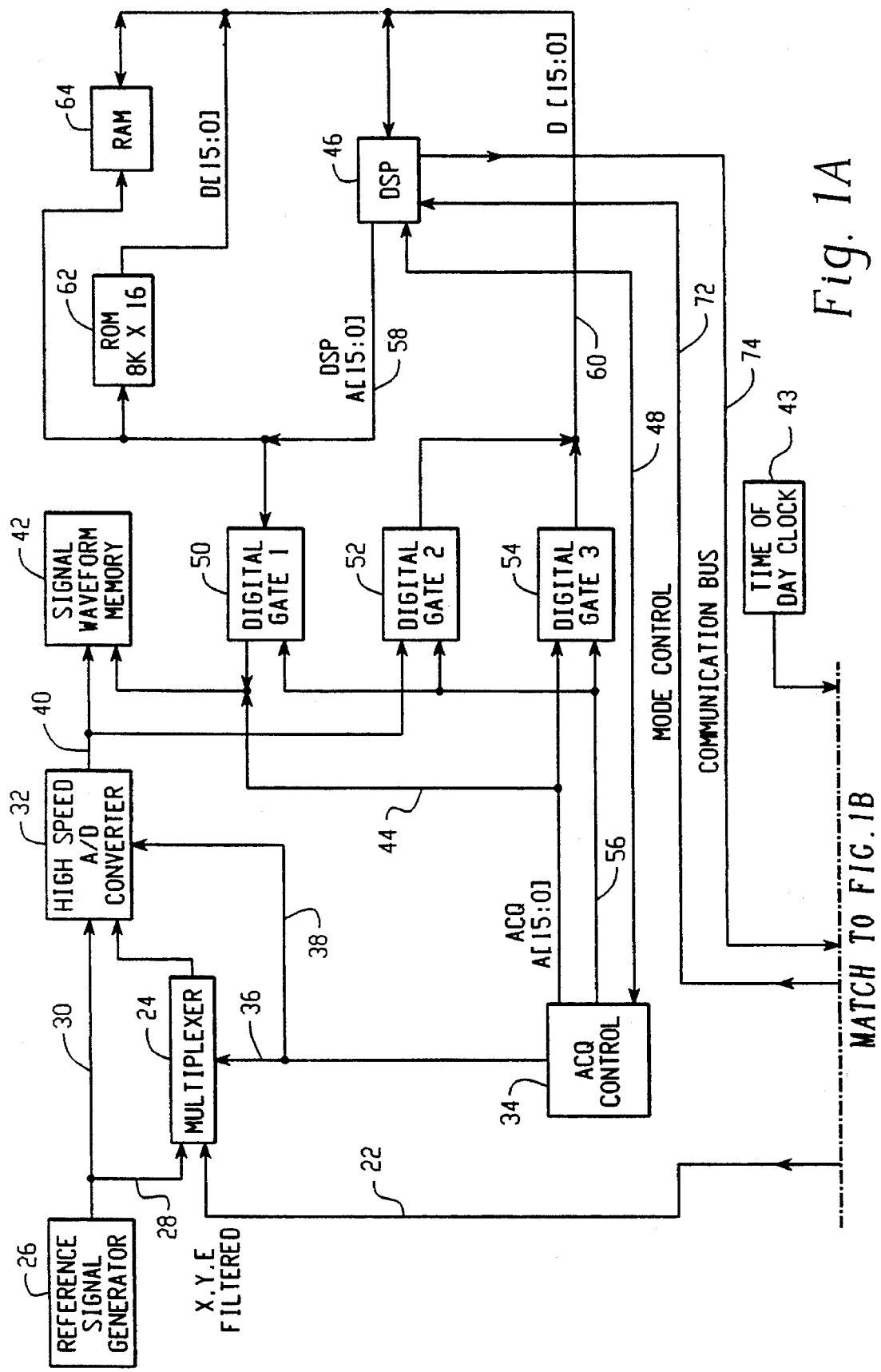
FIGS. 1A and 1B represent a functional block diagram schematic of a thunderstorm cell detection and mapping system suitable for embodying the principles of the present invention.
Figure 1B:
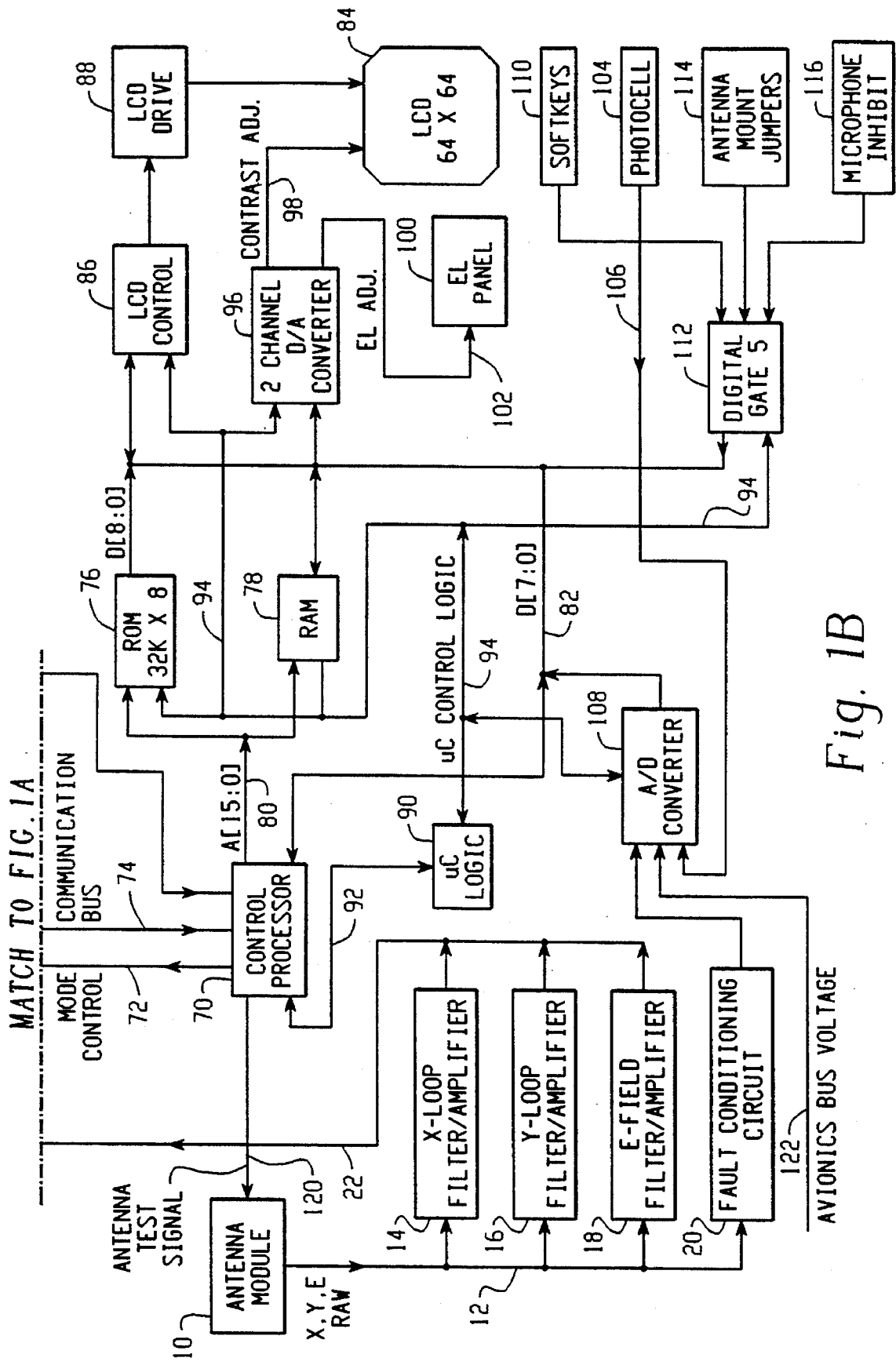

Referring now to FIGS. 1A and 1B, a functional block diagram of a lightning strike detection and mapping system suitable for embodying the principles of the present invention is shown. Referring specifically to FIG. 1B, an antenna module 10 includes a conventional crossed loop antenna for sensing and receiving the magnetic field radiated from a lightning strike. The module 10 includes conditioning circuits coupled to the loop antenna for generating signal waveforms denoted as X and Y representative of the received components of the magnetic field. In the present embodiment, the X and Y signals are substantially orthogonal. Further, the antenna module 10 includes a sense antenna which may be non-directional for sensing and receiving an electrical field radiated from a lightning strike and conditioning circuitry coupled to the sense antenna for generating a signal waveform E representative of the received electric field.

The generated signals X, Y and E are provided over a path 12 to respective filter/amplifiers 14, 16 and 18 for the further conditioning thereof. The three signals X, Y and E are also provided to a fault conditioning circuit 20. The conditioned X, Y and E signals are provided over a path 22 to respective inputs of a multiplexer 24. In addition, a reference signal generator 26 generates one reference signal over path 28 to another input of the multiplexer 24 and another reference signal over path 30 to a reference signal input of a high speed analog-to-digital A/D converter 32.

A data acquisition (ACQ) control block 34 controls the sampling of the X, Y and E signal waveforms and the reference signal by the path 36 and controls the digitizing thereof by the converter 32 with signals over the path 38. In the present embodiment, the digitized samples are generated as a train of data samples provided at a rate of 333 kilosamples per second and corresponding to and representative of each of the X, Y and E signal waveforms and conducted over a data bus 40 to a signal waveform memory 42 for storage therein. With respect to the X and Y signal waveforms, it will be appreciated that the output of the A/D converter 32 will be in units representative of the relative di/dt flux characteristics of the detected lightning strike. In the exemplary embodiment, the various values described herein in comparison to the output of the A/D converter 32 are unitless and are based on a twelve-bit A/D converter 32 with a maximum digital output corresponding to "1500". The system is programmed to automatically calibrate itself by adjusting the gain of the respective filter/amplifiers 14, 16 and 18 in relation to the output of the A/D converter 32 using known calibration techniques prior to system operation. Thus, the relative measures of the X and Y signal waveforms are used to determine the location of the thunderstorm cells as described in more detail below.

Also included in the system is a time of day clock 43 connected to the system controller for providing a time stamp with respect to the time at which the X, Y and E waveforms are received. This time stamp, representing the time of arrival of the detected lightning strike, is used to annotate the X, Y, and E waveforms stored in the signal waveform memory. The ACQ control block 34 addresses the memory 42 utilizing an address bus 44 to designate the storage register of each of the digitized data samples.

The ACQ control block 34 coordinates its operational activities with a programmed digital signal processor (DSP) 46 utilizing bi-directional signal lines 48. The ACQ control block 34 also governs the operation of three digital gates 50, 52 and 54 by the signals over path 56. In the present embodiment, the DSP 46 is capable of addressing the memory 42 using its address bus 58 via gate 50 and also of reading the contents of the addressed storage register of memory 42 over a portion of its data bus 60 via gate 52. The DSP 46 is also capable of reading the ACQ address bus 44 over its data bus 60 via gate 54. The digital signal processing section further includes a read only memory (ROM) module 62 and a random access memory (RAM) module 64, serving as system memory, both of which are coupled to the DSP 46 over the address and data busses 58 and 60, respectively. In this embodiment, the DSP 46 processes the data samples of the sampled-data waveform trains as will be described in more detail below.

Further in the present embodiment, the operations of the DSP 46 are controlled to a large extent by a programmed control processor or microcontroller 70 utilizing signal lines over a path 72 connecting the processor 70 and DSP 46. In addition, processed data, like the strike parameters of the detected lightning strike with respect to an observation location, for example, is provided from the DSP 46 to the control processor 70 over a communication bus 74 coupling the two units. The control processing section also includes a read only (ROM) memory 76 and a random access (RAM) memory 78 (which is considered herein to be part of the system memory 64) which are coupled to the control processor 70 through an address bus 80 and a data bus 82.

The control processor or microcontroller 70 is programmed to drive a display unit 84 from the data bus 82 utilizing a control block 86 and drive block 8 both of which may be part of the display module 84. In the present embodiment, the display module 84 is a liquid crystal display (LCD) (designated 130 in FIG. 2) having on the order of a 64 by 64 pixel array. An ancillary logic block 90 coordinates operational activities with the control processor 70 utilizing a bi-directional signal path 92 to generate and receive logic signals over a bi-directional path 94 which is coupled to the various modules of the control processing section, like the memories 76 and 78 for enabling and controlling read and write operations, for example. The signal path 94 is also coupled to the control block 86 to enable and control the operations thereof as well.

The control processor 70 is also capable of controlling the brightness and contrast of the display module 84 utilizing a two channel digital-to-analog (D/A) converter 96 which is coupled to the processor 70 through the data bus 82. The enabling and control of the converter 96 is provided by signals over path 94. One output signal of the converter 96 governs the contrast of the display unit 84 over path 98 and the other signal adjusts brightness of a back panel light module 100 of the display module 84 over path 102. A photocell 104 disposed in close proximity to the display unit 84 measures ambient light conditions and generates a signal over path 106 representative thereof. The control processor 70 is capable of reading the signal 106 through an analog-to-digital (A/D) converter 108 and the data bus 82. Once again, the signals of the path 94 enable and operate the converter 108.

Still further, operator interface pushbuttons referred to as softkeys and designated by block 110 may be read by the control processor 70 through a digital gate 112 and the data bus 82. The gate 112 also permits reading of other digital signals, like antenna mount jumpers designated by the block 114 and a microphone inhibit signal designated by the block 116, for example. Similarly, the gate 112 is enabled and controlled by the logic signals of path 94.

Finally, the control processor 70 is capable of generating an antenna test signal over path 120 to the antenna module 10 for testing the X, Y and E receiving circuits thereof. Resultant test signals of the X, Y and E circuits are conducted over the path 12 and through the conditioning circuit 20 to the A/D converter 108 for reading by the control processor 70 via the data bus 82.

The foregoing description of the functional block embodiment of FIGS. 1A and 1B is provided merely as an overview of the system hardware. A more detailed description of many of the features and components of the system of FIGS. 1A and 1B and the operation thereof can be found in U.S. Pat. No. 5,295,071, issued on Mar. 15, 1994, and in U.S. Pat. No. 5,295,072, also issued on Mar. 15, 1994, the entire disclosures of which are both incorporated herein by reference. These patents describe methods of operating of the system shown in FIG. 1 to obtain a range estimate and bearing estimate for each individual lightning strike. Generally speaking, the X, Y and E components of the received signals are processed to provide a range estimate and bearing estimate of the detected lightning strike. It will be appreciated that the system operation and hardware of the present invention is generally identical in substantive respect to that of the systems described in the above-identified U.S. Pat. Nos. '071 and '072 patents except as otherwise noted herein.

Figure 2:
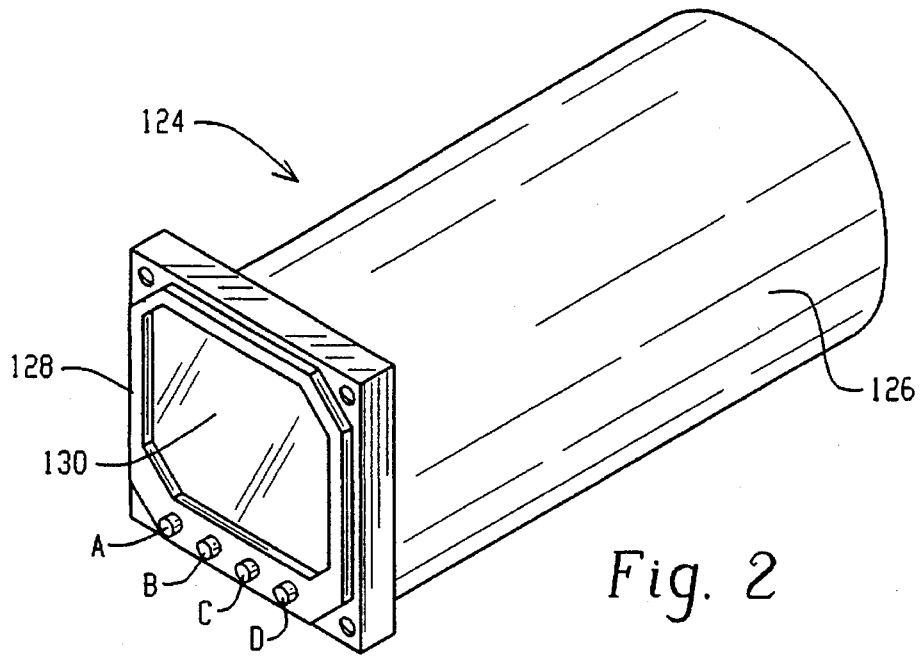
FIG. 2 is an illustration of an exemplary physical embodiment of the preferred system which depicts the display module and the electronic processing section enclosure thereof.

Referring briefly to FIG. 2, an illustration of an exemplary physical embodiment of the preferred system shows the display module depicted at 124 and the electronic processing section enclosed within an enclosure depicted at 126. Four softkeys or pushbuttons A, B, C and D are disposed at the bottom of the display section 124 within a bezel mount 128 surrounding the a panel LCD unit 130. The photocell or ambient light measuring instrument may be disposed in close proximity to the display 130 like, for example, in the bezel 128 thereof.

Figure 3:
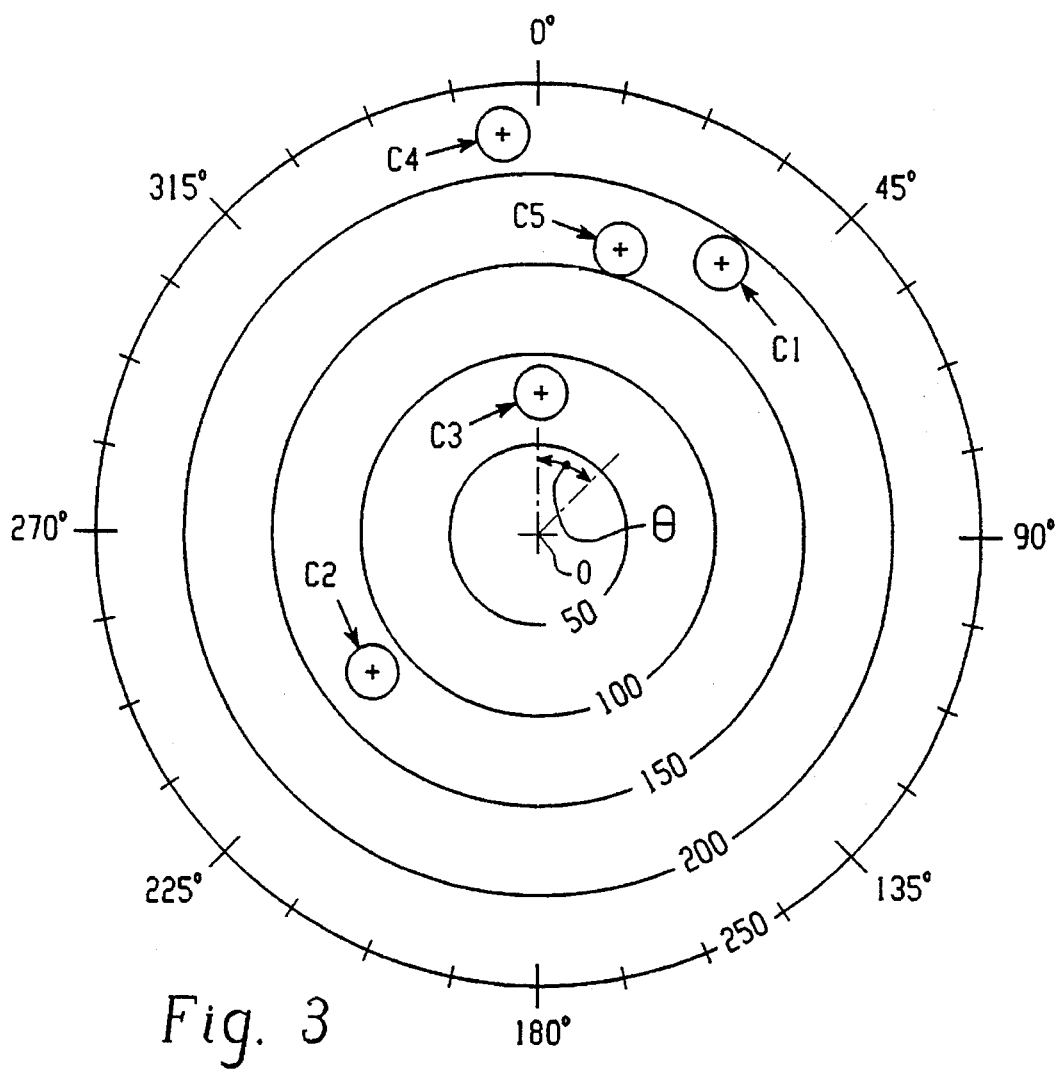
FIG. 3 is a representation of an illustrative display produced by the system of FIG. 1.
Figure 4:
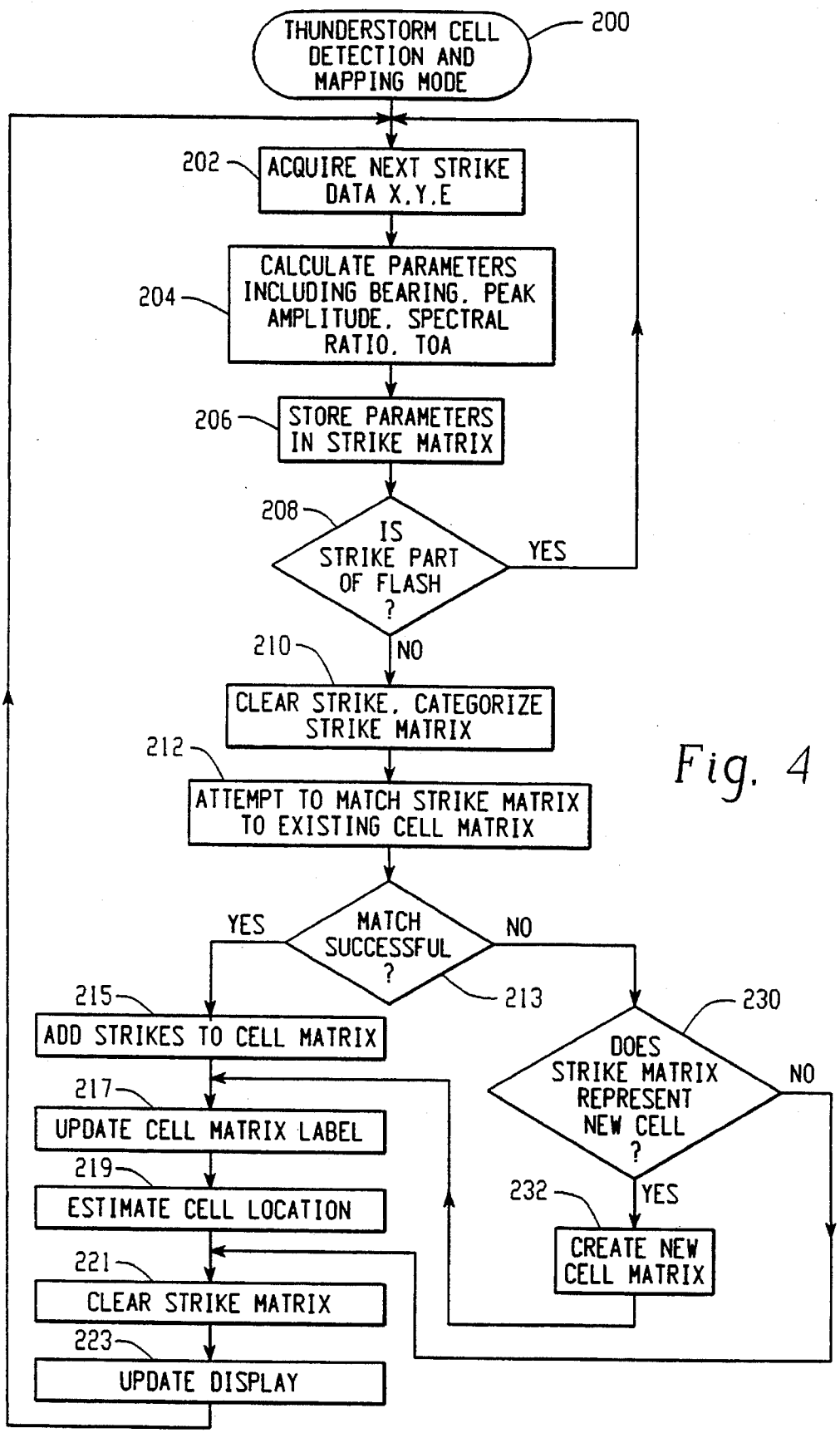
FIG. 4 is a software flow chart suitable for programming the system shown in FIGS. 1A and 1B to operate in a thunderstorm cell detection and mapping mode in accordance with the present invention.

FIG. 3 shows an example of a screen display on the LCD unit 130 which the thunderstorm cell detection and mapping routine of FIG. 4 generates in accordance with the present invention. In the preferred embodiment, the system provides full 360° thunderstorm cell detection and mapping. The origin O of the display represents the location of the sensor, e.g., the antenna module 10 of FIG. 1B. Concentric circles formed about the origin O serve as reference indicators for ranges r equal to 50, 100, 150, 200 and 250 statute miles from the sensor, respectively, as indicated. Additional circles may be included to indicate ranges beyond 250 miles as will be appreciated. The bearing angle θ indicates the angle of the detected thunderstorm cell relative to a reference axis and can be equal to any angle between 0° and 360°. The microcontroller 70 is programmed to cause each thunderstorm cell located by the system to be displayed on the LCD unit 130 at the corresponding range estimate r and bearing estimate θ. Active thunderstorm cells appear on the display as small circles or other icons formed by darkened pixels on a backlit screen. For sake of example, FIG. 3 shows active cells C1–C5 as being detected within the range of the system at a given moment in time. Active cell C1, for example, has a range centered at about 190 miles from the origin O and a bearing θ of approximately 30°. Active cell C2 has a range of approximately 170 miles and a bearing θ of 15°.

Referring now to FIG. 4, the operation of the thunderstorm cell detection and mapping system will be described. Beginning in block 200, the system is programmed to enter the thunderstorm cell detection and mapping mode as a result of a user menu selection, for example. In block 202, the system acquires the strike data X,Y, and E for a detected lightning strike in the manner described above. The X,Y, and E data is then processed by the DSP 46 in block 204 in order to calculate a variety of parameters describing the detected lightning strike. Specifically, the system calculates the bearing θ of the lightning strike, the peak amplitude, the spectral ratio component (SRC), and the time of arrival (TOA) of the lightning strike as follows: The bearing θ of the lightning strike is calculated based on known techniques such as, for example, the method described in the aforementioned U.S. Pat. Nos. 5,295,071 and 5,295,072. Generally speaking, the bearing θ can be calculated as follows:

$$\theta = \arctan X/Y;$$

however, it will be appreciated that other known techniques for calculating the bearing θ of a single strike can be used without departing from the scope of the invention.

The peak amplitude of the lightning strike is calculated in block 204 by calculating the absolute peak of the resultant waveform R formed by the X and Y signals as follows:

$$\text{peak amplitude} = \max |R = X^* \sin\theta + Y^* \cos\theta|$$

where "max" represents the maximum operator, "*" represents the multiplication operator, and θ equals the bearing of the strike.

The spectral ratio component (SRC) is determined by:
(1) calculating the Fast Fourier Transform (FFT) of the resultant waveform R;
(2) calculating the high frequency spectral ratio (HFSR) of waveform R, where the HFSR is equal to the peak amplitude in the frequency domain of the waveform R in the band between 31 kHz and 44 kHz divided by the peak amplitude in the band between 52 kHz and 65 kHz;
(3) calculating the low frequency spectral ratio (LFSR) of the waveform R, where the LFSR is equal to the peak amplitude in the frequency domain of the waveform R in the band between 2.6 kHz and 13 kHz divided by the peak amplitude between 26 kHz and 39 kHz; and (4) in the event:
(a) HFSR≥LFSR, then SRC=1
(b) HFSR<LFSR, then SRC=0.

The particular frequency bands identified above for calculating the value of SRC are preferred but are in no way the only bands which could be used for evaluating the relative frequency content of the lightning strike waveform. A different criteria could be used as will be appreciated.

The system determines the time of arrival (TEA) of the lightning strike directly from the time stamp associated with the data from clock 43 (FIG. 1A).

In block 206, the system stores the lightning strike parameters calculated in block 204 in a strike matrix in the system memory 64. In the exemplary embodiment of the present invention, the strike matrix is a temporary buffer configured as shown in Table 1 below. The strike matrix can store for each of up to 13 strikes added to the strike matrix the bearing θ, time of arrival (TEA), peak amplitude, and spectral ratio component (SRC) as calculated in block 204. Such information is stored in the strike matrix via the DSP 46 using conventional techniques.

TABLE 1

| | STRIKE MATRIX | | | |
|---|---|---|---|---|
| Strike | Bearing θ | TOA | Peak Amp. | SRC |
| 1 | | | | |
| 2 | | | | |
| . | | | | |
| 13 | | | | |

In block 208, the system determines whether the currently detected strike is part of a flash. As is described in more detail below in relation to FIG. 5, a flash is defined as a plurality of strikes which occur rapidly in sequence at approximately the same bearing. If the strike is part of a flash, the system returns to block 202 and waits until such time as the strike data for the next lightning strike is detected and received. The steps in block 204 and 206 are then repeated and the strike data for each strike in the flash is stored in a corresponding location in the strike matrix in the format shown in Table 1. As a result, the strike matrix begins to accumulate lightning strikes belonging to the same flash. The system continues to loop through blocks 202, 204, 206 and 208 until such time as the strike matrix accumulates the maximum 13 strikes or the system otherwise determines that the most recently detected strike is not part of a flash in block 208.

Upon determining in block 208 that the current strike is not part of a flash, the system proceeds to block 210 in which the system clears the current strike from the strike matrix (the system having determined the strike not to be part of the same flash as the other strikes). The cleared strike data is stored temporarily within the system so that such strike will serve as the next strike in blocks 202 and 204 following the processing of the data currently stored in the strike matrix. Also in block 210, the system assigns a confidence label to the strike matrix by analyzing the strike parameters for the different strikes stored in the strike matrix as described below with respect to FIGS. 6A–6B. Generally speaking, the system via the control processor 70 analyzes the parameters for all the strikes in the strike matrix based on a predetermined criteria in order to categorize the strike matrix as representing a flash which is either near to the origin, far from the origin, or somewhere in between, i.e., in the middle. The system assigns a confidence label to the strike matrix based on the predetermined criteria to provide an indication of the degree of confidence with which the flash represented by the strike matrix is most likely located either "near", "mid" or "far" relative to the system origin.

Following block 210, the system in block 212 attempts to match the strikes included in the strike matrix to an existing thunderstorm cell as will be described below in connection with FIG. 7. In general, the system according to the present invention maintains in the system memory 64 a cell matrix for each active thunderstorm cell which is identified by the system. The strikes included in a strike matrix which is matched to a cell matrix are then added to the cell matrix. If the strike matrix cannot be matched to an existing cell matrix, the strikes in the strike matrix are under some conditions used to form a new cell matrix representing a new thunderstorm cell. Table 2 below illustrates the structure of an exemplary cell matrix which is maintained by the control processor 70 in the system memory 64.

TABLE 2

| | CELL MATRIX | | | | | | |
|---|---|---|---|---|---|---|---|
| Strike | Bearing θ | SRC | TOA | Peak Amp | Conf. Label | Est. Range | rate |
| 1 | | | | | | | |
| 2 | | | | | | | |
| 3 | | | | | | | |
| . | . | . | . | . | . | . | . |
| . | . | . | . | . | . | . | . |
| . | . | . | . | . | . | . | . |
| 29 | | | | | | | |
| 30 | | | | | | | |

Each cell matrix is sized to store data on up to thirty different lightning strikes. For each lightning strike, the system stores the bearing θ, the spectral ratio component (SRC), the time of arrival (TOA), and the peak amplitude as calculated for each respective strike in block 204 at the time the strike was detected. In addition, the cell matrix stores for each strike the confidence label associated with the strike matrix from which the strike came from prior to becoming part of the cell matrix. As a result, strikes in the cell matrix which originated from the same flash in block 208 will have identical confidence labels in the cell matrix. In addition, the system stores in the cell matrix the estimated range of the thunderstorm cell represented by the cell matrix at the time the strike was added to the cell matrix as determined in the manner described below in connection with FIG. 10A. Furthermore, the cell matrix includes a column for storing strike rate information for the strikes included in the cell at the time the respective strike was added to the cell matrix. Specifically, the control processor 70 calculates the number of strikes per minute which occur in the cell matrix as follows:

$$\text{strike rate} = \frac{\text{total number of strikes in cell matrix}}{\text{latest } TOA - \text{earliest } TOA} \quad \text{(strikes/minute)}$$

where the "earliest TOA" and "latest TOA" represent the time of arrivals for the earliest and latest strikes stored in the cell matrix.

The cell matrix for each thunderstorm is configured as a first-in-first-out (FIFO) type buffer. As a result, as new strikes are added to the cell matrix the older strikes exceeding the maximum capacity of thirty are removed. Thus, each active thunderstorm cell is represented in the system memory by a corresponding cell matrix which includes up to the most recent thirty lightning strikes associated therewith.

It will be appreciated, however, that cell matrices with smaller or larger size capacities can be used depending on the available memory space without departing from the scope of the invention.

The system in block 213 determines whether the strike matrix formed in blocks 202–210 was successfully matched to an existing cell matrix in block 212. If yes, the strikes in the strike matrix are added to the matching cell matrix in block 215. Following the addition of the strikes in the strike matrix with those in the matching cell matrix, the system in block 217 proceeds to update the label of the cell matrix in the manner described below in connection with FIGS. 9A–9D. Briefly, each cell matrix includes a label associated therewith which categorizes the cell matrix as representing a thunderstorm cell which is either "near", "mid" or "far" relative to the system origin. In block 217, the system updates the cell matrix label to take into account the newly acquired data from the strike matrix. The system then proceeds to block 219 in which the system uses the cell matrix label in combination with a look-up table stored in the system memory 64 to estimate the range of the thunderstorm cell represented by the cell matrix. The system then stores the estimated range in the cell matrix with respect to those strikes which were newly added to the cell matrix. Thereafter, the system proceeds to block 221 in which the DSP 46 clears the strike matrix, e.g., sets its contents to zero, and thereafter the system updates the display 130 (FIG. 2) in block 223. Each time the display 130 is updated, the system effects the display of thunderstorm cells represented by the cell matrices being maintained in the system memory. The system then returns to block 202 where strike data for the next lightning strike is received and processed to form a new strike matrix in the above described manner.

If in block 213 the system concludes that the strike matrix can not be successfully matched to an existing cell matrix, the system proceeds to block 230 in which the system determines if the strike matrix represents a new thunderstorm cell. In particular, the system compares the strikes in the strike matrix to a predetermined criteria in a manner discussed below in connection with FIG. 8. If the strike matrix represents a new thunderstorm cell, the system in block 23 creates a new cell matrix in the system memory corresponding to the new thunderstorm cell and includes therein the corresponding data for the strikes in the strike matrix. The system then proceeds to block 217 in which the cell matrix label for the new cell matrix is updated (or in this case, created). The system then estimates the range of the cell in block 219 and stores the estimated range in the cell matrix in relation to those strikes which were newly added to the cell matrix. Thereafter, in blocks 221 and 223 the system clears the strike matrix and updates the display 130 to include the thunderstorm cell represented by the newly created cell matrix. If in block 230 the strike matrix is determined not to represent a new cell, the system proceeds to block 221 in which the strike matrix is cleared. The display is then updated in block 223.

Figures 4A, 5:
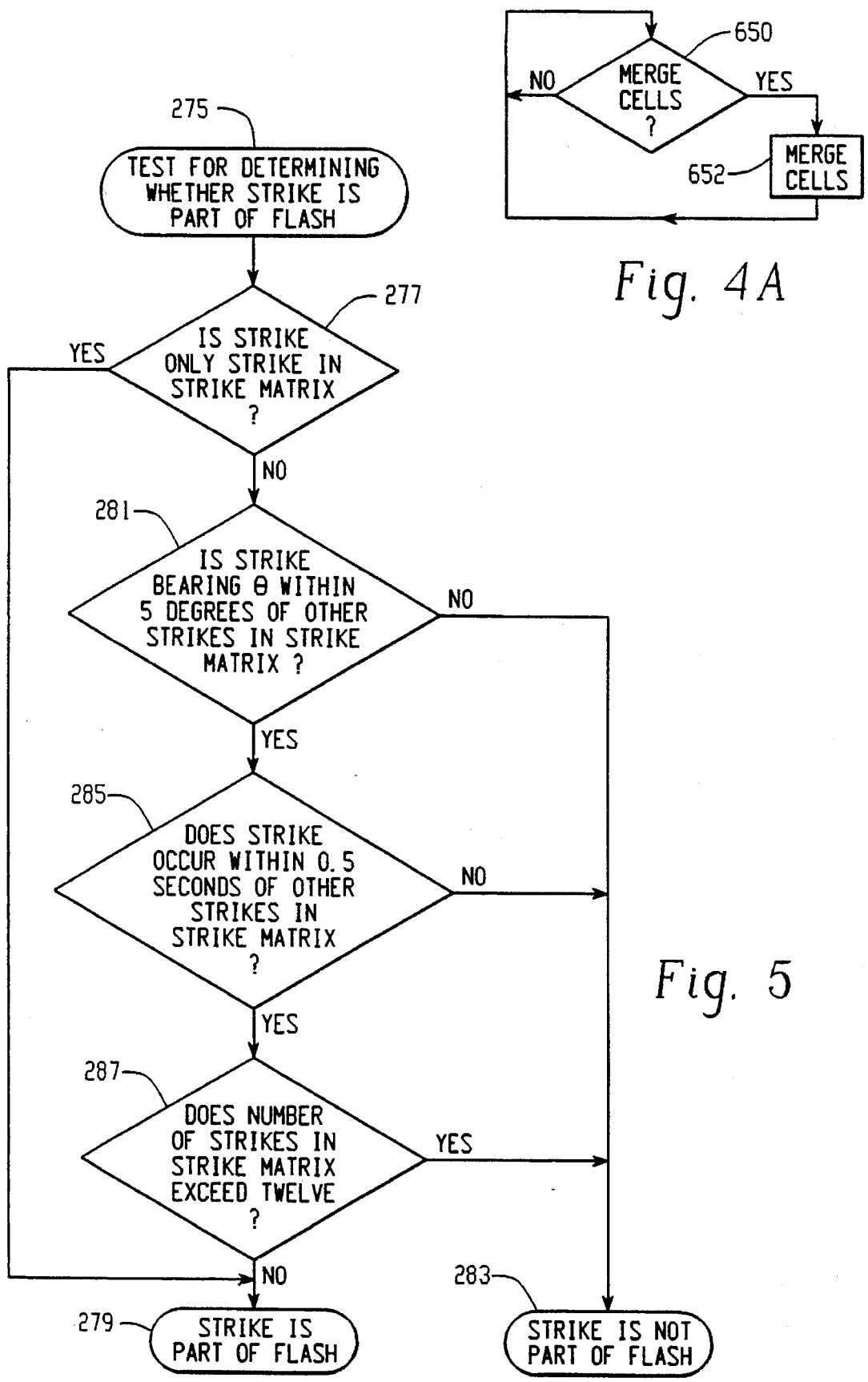
FIG. 4A is a software flow chart suitable for programming the system to monitor the existing cell matrices to determine whether any thunderstorm cells can be merged in system memory.
FIG. 5 is a software flow chart suitable for programming the system to determine whether a detected strike is part of a flash in accordance with the present invention.

Referring now to FIG. 5, the process referred to in block 208 of FIG. 4 for determining whether a strike is part of a flash will now be described beginning with block 275. In the exemplary embodiment, a flash is considered to exist when two or more strikes occur having a bearing θ within 5 degrees of each other and which occur within 0.5 seconds of each other. It will be appreciated, however, that other definitions for a flash can be used in accordance with the present invention. Following block 275, the system determines in block 277 whether the current strike is the only strike in the strike matrix. If so, the system proceeds to block 279 in which the system automatically assumes the current strike is part of a flash. Otherwise, the system proceeds to block 281 in which the DSP 46 determines whether the strike bearing θ of the current strike is within 5 degrees of all the other strikes in the strike matrix. If not, the system proceeds to block 283 where it is concluded that the current strike is not part of the same flash represented by the other strikes in the strike matrix. As a result, the system proceeds to block 210 in FIG. 4 in which the current strike is cleared from the strike matrix.

Referring again to block 281, if the bearing θ for the current strike is within 5 degrees of the other strikes the system proceeds to block 285 in which the DSP 46 checks the time of arrival information for each strike to determine if the current strike occurred within 0.5 seconds of the other strikes in the strike matrix. If it did not, the system proceeds to block 283 where the system concludes that the current strike is not part of the flash represented by the other strikes in the strike matrix. Otherwise, the system proceeds to block 287 in which the DSP 46 determines if the number of strikes in the strike matrix exceeds twelve, twelve being the maximum number of strikes which are processed as part of the same flash in the exemplary embodiment. It will be appreciated, however, that a number different from twelve can be used without departing from the scope of the invention. If there are more than twelve strikes in the strike matrix, the system again proceeds to block 283 in which the system concludes that the current strike is not part of the flash. Otherwise, the system continues from block 287 to block 279 where the system concludes that the current strike is part of the same flash. Following blocks 279 and 283, the system returns to block 208 in FIG. 4.

Figure 6A:
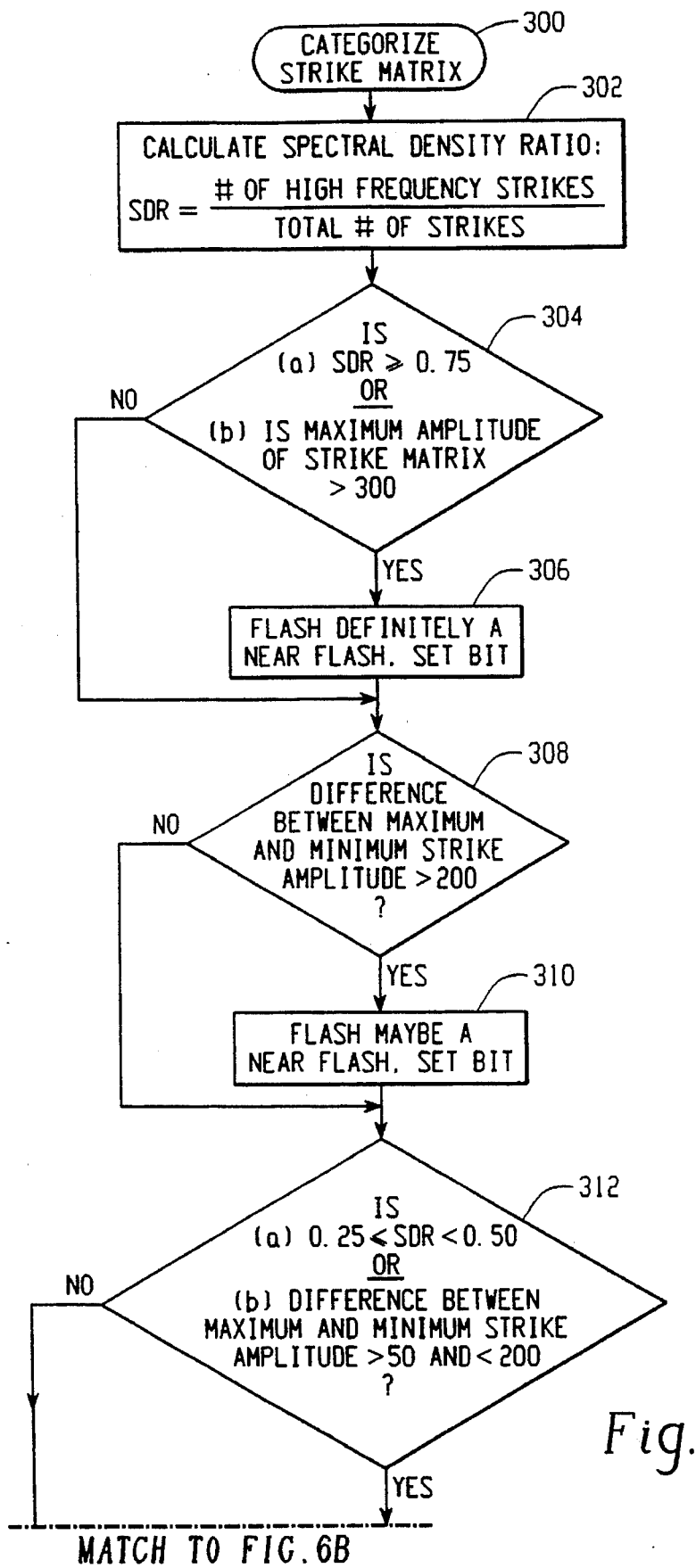
FIGS. 6A, 6B and 6C represent a flow chart suitable for programming the system to categorize a strike matrix based on a confidence label in accordance with the present invention.
Figure 6B:
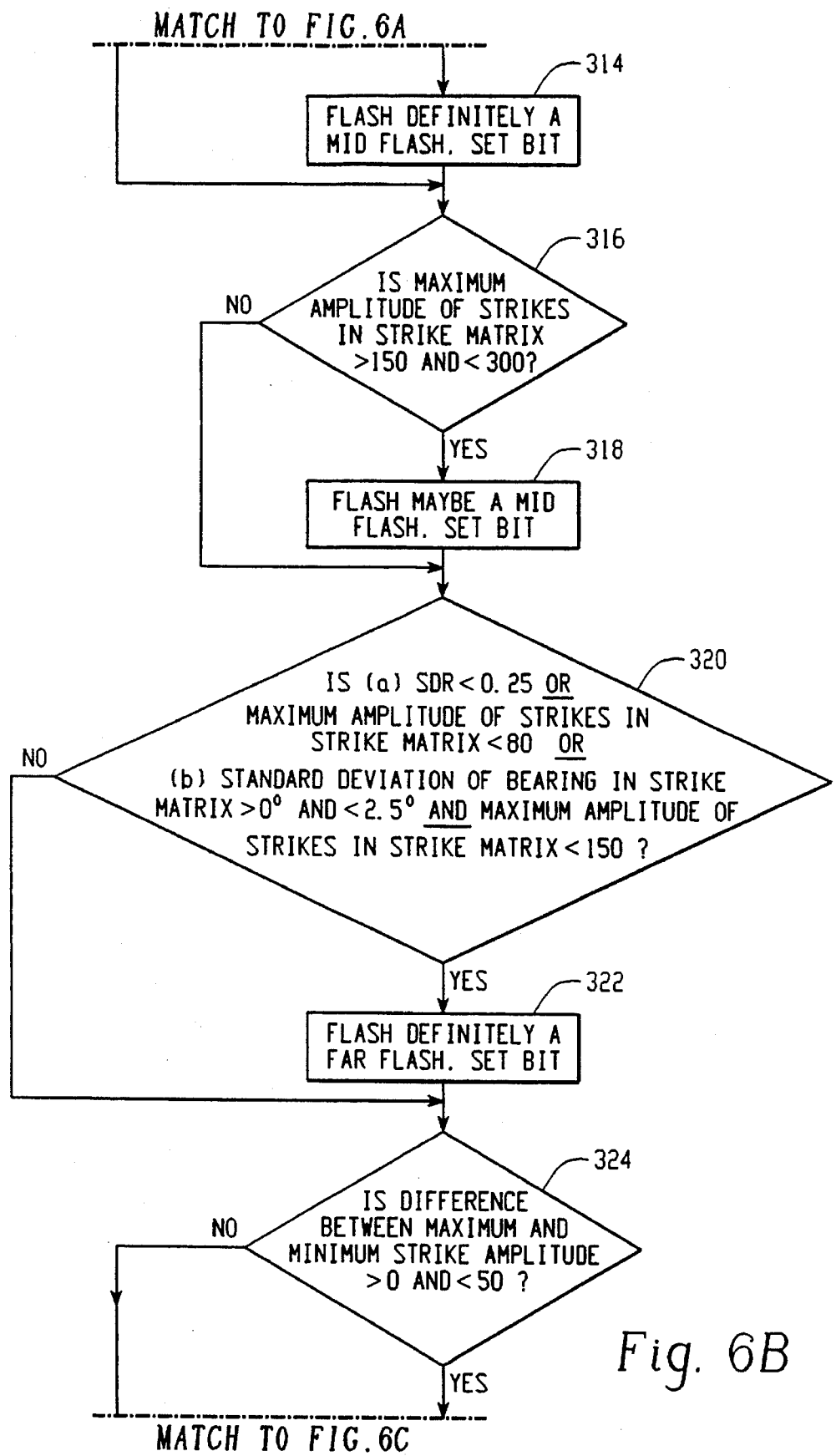
Figure 6C:
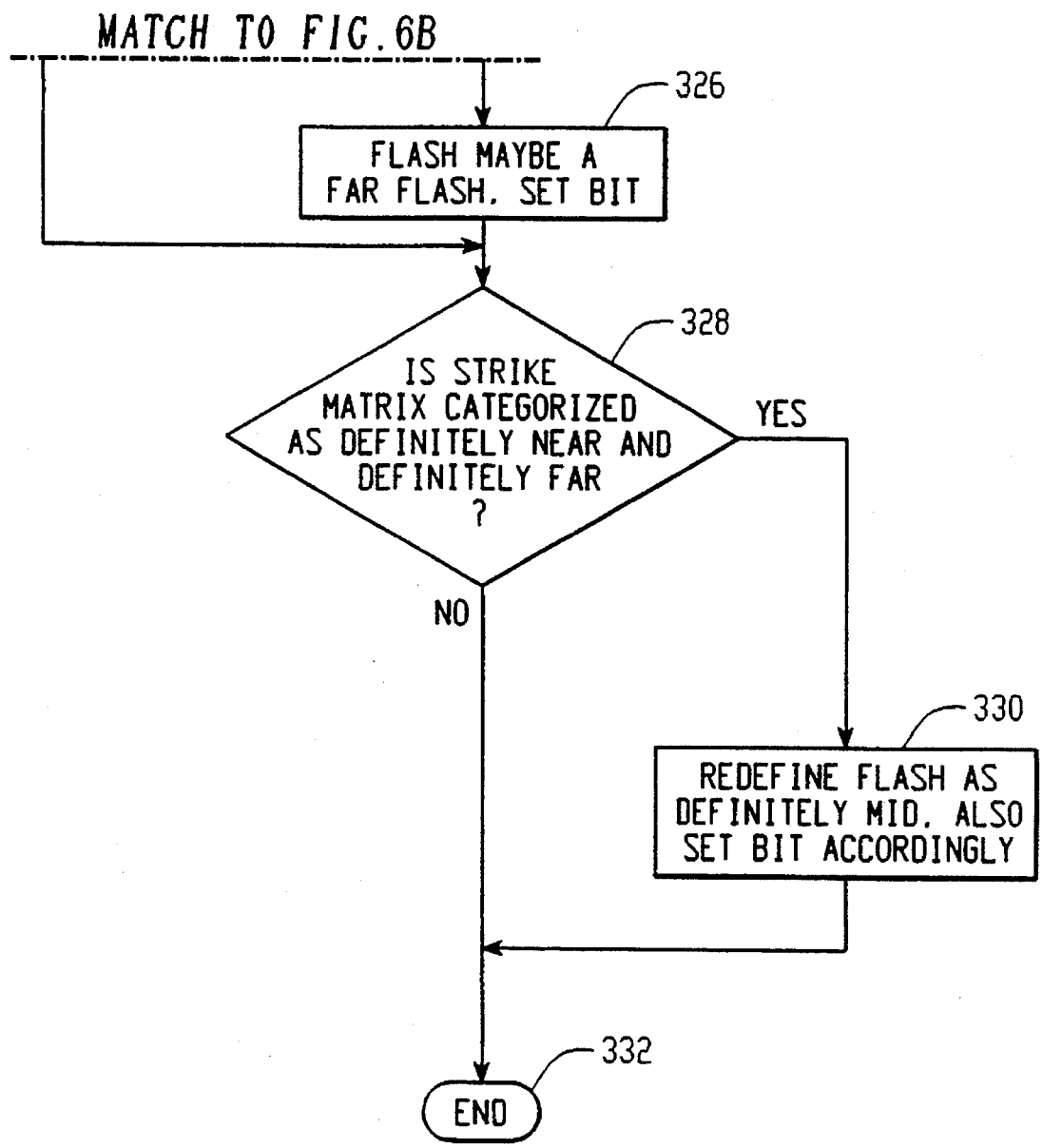

Turning now to FIGS. 6A and 6B, the procedure for developing a confidence label in block 210 for each strike matrix will be described beginning with block 300. In the exemplary embodiment, the strike matrix corresponding to each flash can be categorized using an eight-bit confidence label having the following eight-bit structure:

CONFIDENCE
LABEL:
$\bar{8}$ $\bar{7}$ $\bar{6}$ $\bar{5}$ $\bar{4}$ $\bar{3}$ $\bar{2}$ $\bar{1}$ where the following bits, when set equal to one, represent the following conditions:

| Bit | Condition |
|-----|-----------|
| 1 | maybe near |
| 2 | definitely near |
| 3 | maybe mid |
| 4 | difinitely mid |
| 5 | maybe far |
| 6 | definitely far |
| 7 | not used |
| 8 | not used |

As will be appreciated based on the following description, the confidence label for each strike matrix developed by the system via the control processor 70 is based on the strike parameters stored therein. Initially, the confidence label is initialized to all 0's and then the respective bits are set based on the strike parameters. The confidence label serves to provide a measure of confidence with which the strikes stored in the strike matrix are believed to originate at a location which is near, mid or far relative to the system origin.

Beginning with block 302, the system first calculates the spectral density ratio (SDR) of the strike matrix as follows:

$$SDR = \frac{\text{NUMBER OF STRIKES IN STRIKE MATRIX WITH } SRC = 1}{\text{TOTAL NUMBER OF STRIKES IN STRIKE MATRIX}}$$

The value of SDR indicates the percentage of strikes in the strike matrix which have a relatively high frequency content compared to the total number of strikes. It has been found that signals which are received from lightning strikes which are closer in range tend to have a higher frequency content as compared to strikes which are further in range, presumably due to the increased path loss at the higher frequencies. Furthermore, the peak amplitudes of the lightning strikes tend to be inversely related to the distance of the lightning strike from the origin. Again this is presumably due to the increased path loss at longer distances. Based on such phenomenon, the system evaluates the SDR and the maximum peak amplitude of the strikes in the strike matrix in order to categorize the strike matrix as having a location which is near, mid or far. The system then sets the bits in the confidence label accordingly. Thus, in block 304 the system determines whether the value of SDR is greater than or equal to a near flash threshold (e.g., 0.75), or if the maximum amplitude of the strikes in the strike matrix is greater than a near flash amplitude threshold (e.g., a value of 300 relative to the output of the A/D converter 32). If either of these conditions are satisfied, the system proceeds to block 306 in which the flash represented by the strike matrix is considered to definitely be a near flash, and the control processor 70 sets the definitely near bit (bit2) of the confidence label to 1. Otherwise, the system proceeds to block 308 and bypasses block 306. In block 308, the system calculates the difference between the maximum peak amplitude and minimum peak amplitude of the strikes in the strike matrix. If the difference is greater than a predetermined threshold such as 200, such a relatively large spread between the maximum and minimum peak amplitudes in the strike matrix suggests that the flash represented by the strike matrix may be a near flash. Thus, in block 310 the maybe near bit (bit 1) is set in the strike matrix confidence label.

If in block 308 the difference between the maximum and minimum peak amplitudes is not greater than 200, the system bypasses block 310 and proceeds directly to block 312 as is shown. In block 312, the system checks whether the value of SDR calculated in block 302 is within a predetermined range selected to represent a flash which is located somewhere in the middle between near and far. For example, the system in the exemplary embodiment determines if the value of SDR is greater than or equal to 0.25 and less than 0.50. In addition, the system determines whether the difference between the maximum peak amplitude and minimum peak amplitude of the strikes stored in the strike matrix is greater than 50 and less than 200. If either of these conditions is satisfied, the system proceeds to block 314 in which the system sets the definitely mid bit (bit 4) in the strike matrix confidence label to 1. The system then proceeds to block 316; however, if neither of the conditions are satisfied in block 312, the system bypasses block 314 and proceeds directly to block 316.

In block 316, the system checks whether the maximum peak amplitude of the strikes in the strike matrix is greater than 150 and less than 300, thereby suggesting a flash having a range somewhere in the middle of near and far. If so, the system proceeds to block 318 in which the flash represented by the strike matrix is considered to maybe be a mid flash and the system sets the maybe mid bit (bit 3) in the confidence label to 1.

If the maximum peak amplitude of the strikes in the strike matrix is not within the range of 150 to 300, the system proceeds directly from block 316 to block 320, thus bypassing block 318. In block 320, the system determines if either of the following conditions are satisfied:

(a) The value of SDR is less than 0.25; OR the maximum peak amplitude of the strikes in the strike matrix is less than 80; OR (b) The standard deviation of the bearing angle θ for all the strikes in the strike matrix, $\sigma_\theta$, is greater than 0 degrees and less than 2.5 degrees, AND the maximum peak amplitude of the strikes in the strike matrix is less than 150.

With regard to condition (a), if the value of SDR is lower than a predetermined threshold (e.g., 0.25) this indicates very little high frequency content suggesting that the flash is located far away. Similarly, if the maximum peak amplitude of the strikes in the strike matrix is relatively low (eg., less than 80), this also suggests a flash which is located far away. With regard to condition (b), if the standard deviation $\sigma_\theta$ of the bearing angles θ in the strike matrix is relatively small (e.g., 2.5 degrees or less) and the maximum peak amplitude of the strikes is relatively low, these concurrent conditions suggest a flash which is located far away. Accordingly, if either condition (a) or (b) in block 320 is satisfied, the system proceeds to block 322 in which the system considers the flash to definitely be located far away and therefore sets the definitely far bit (bit 6) in the strike matrix confidence label to 1. The system then proceeds to block 324. In the event that neither condition (a) nor (b) is satisfied in block 320, the system proceeds directly to block 324 as is shown. In block 324, the system determines if the difference between the maximum peak amplitude and minimum peak amplitude of the strikes in the strike matrix is greater than 0 but less than 50. Such threshold values have been found to be indicative of a flash which may be located far relative to the system origin. If the difference is between 0 and 50, the system in block 326 sets the maybe far bit (bit 5) to 1 in the strike matrix confidence label and proceeds to block 328. Otherwise, the system proceeds directly from block 324 to block 328.

As will be appreciated, it is possible that two or more bits in the confidence label will be set in the blocks between block 300 and block 328. In block 328, the system checks whether the strike matrix has been categorized as being both definitely near and definitely far by checking whether both the definitely near and definitely far bits (bits 2 and 6, respectively) have been set in the confidence label. This condition is considered by the system to be inconclusive. As a result, the system in block 330 adjusts the confidence label of the strike matrix to indicate a flash definitely occurring in each of the near, middle and far ranges. Specifically, the control processor 70 will set the definitely mid bit (bit 4) to 1 in addition to the current status of the label. If the strike matrix has not been categorized as both definitely near and definitely far, the system proceeds to block 332 in which the procedure for categorizing the strike matrix by developing a confidence label is concluded. The confidence label is then stored in system memory and is utilized for subsequent processing as is described below.

It is noted that various predetermined threshold values are described above with respect to FIGS. 6A and 6B and throughout the entire description. Such values are provided merely as representing the preferred threshold values and are by no means the only values which could be used. Other threshold values selected to obtain similar or equivalent results are well within the intended scope of the invention.

Referring briefly back to FIG. 4, after the strike matrix has been categorized in block 210, the system proceeds to block 212 in which the system attempts to match the strike matrix to an existing cell matrix maintained in the system memory based on the confidence label. The procedure for matching the strike matrix to an existing cell will now be described with respect to FIG. 7 beginning at block 350. The system proceeds from block 350 to block 352 in which the system via the control processor 70 calculates the mean or average of the strike bearing θ included in the strike matrix and similarly calculates the mean of the strike bearings θ with respect to each of the cell matrices based on the strikes included therein. The system then determines whether there exists any thunderstorm cells as represented by the cell matrices which have a mean strike bearing $\theta_{avg}$ within 5 degrees of the mean strike bearing $\theta_{avg}$ of the strike matrix. If not, the system proceeds to block 354 in which it is concluded that the strike matrix is not sufficiently close in average bearing to be matched to an existing cell matrix.

Otherwise, the system proceeds to block 356 in which a matching weight for the strike matrix is determined with respect to each cell matrix having a mean strike bearing $\theta_{avg}$ within 5 degrees of the mean strike bearing $\theta_{avg}$ of the strike matrix as determined in block 352. More specifically, Table 3 below represents a table of matching weights which is stored in the system memory and serves as a system look-up table. The values in the table are indexed based on the confidence label of the strike matrix to be matched and the label of the cell matrix (e.g., near, mid or far) with which the strike matrix is being compared to for purposes of matching. The label of each cell matrix is determined in block 217 (FIG. 4) in the manner which is discussed in detail below.

archived lightning strike data. Each entry in the table represents the likelihood that strikes in a strike matrix having a confidence label as shown is part of a thunderstorm cell represented by cell matrix having either a near, mid or far label. In Table 3, "100" represents the highest weighting factor and the most likely condition; and "X" represents the most unlikely condition, X being equal to zero. Thus, for example, a confidence label having the hexadecimal value "02" (binary value "00000010"), which corresponds to a confidence label of "definitely near", has a 100 chance of matching to a cell which is labelled near, a 60 chance of matching to a cell which is labelled mid, and a 35 chance of matching to a cell which is labelled far.

In block 356, the system looks up in the look-up table the matching weight for the strike matrix with respect to each cell matrix within 5 degrees as identified in block 352. In block 358, the system determines the maximum matching weight obtained from the look-up table and identifies the particular cell matrix associated therewith. In block 360, the system determines whether the maximum matching weight is greater than a predetermined threshold which, in the exemplary embodiment, is 50. Thus, if the maximum matching weight is greater than 50 in block 360, the system proceeds to block 362 in which it is concluded that the strike matrix successfully matches to the cell matrix corresponding to the maximum matching weight. Otherwise, the system proceeds from block 360 to block 354 whereby the system concludes that the match is unsuccessful.

In another embodiment, the system further includes in block 356 an outlier test for determining whether a combination of the strikes included in the strike matrix with those in a given cell matrix would result in an outlier condition. If an outlier condition would exist in the event the strike matrix were matched to the given cell matrix and the strikes were combined, the system compensates by adjusting the matching weight obtained from Table 3 to account for the reduced likelihood of such combination being valid. For example, the system checks the combination of strikes for the existence of an outlier by initially determining 30% of the maximum peak amplitude with respect to all the strikes in

TABLE 3

MATCHING WEIGHTS

| | \multicolumn{16}{c}{Confidence Label} | | | | | | | | | | | | | | | |
|---|---|---|---|---|---|---|---|---|---|---|---|---|---|---|---|---|
| | 00 | 01 | 02 | 03 | 04 | 05 | 06 | 07 | 08 | 09 | 0A | 0B | 0C | 0D | 0E | 0F |
| Near | X | 60 | 100 | 100 | 50 | 60 | 100 | 100 | 75 | 80 | 100 | 100 | 50 | 75 | 100 | 100 |
| Mid | X | 50 | 60 | 60 | 60 | 60 | 75 | 75 | 100 | 100 | 100 | 100 | 100 | 100 | 100 | 100 |
| Far | X | 25 | 35 | 15 | 25 | 25 | 35 | 35 | 60 | 55 | 25 | 25 | 50 | 50 | 50 | 50 |
| | 10 | 11 | 12 | 13 | 14 | 15 | 16 | 17 | 18 | 19 | 1A | 1B | 1C | 1D | 1E | 1F |
| Near | 60 | 60 | 100 | 100 | 50 | 50 | 100 | 100 | 75 | 80 | 100 | 100 | 50 | 75 | 100 | 100 |
| Mid | 75 | 50 | 60 | 60 | 60 | 60 | 75 | 75 | 100 | 100 | 100 | 100 | 100 | 100 | 100 | 100 |
| Far | 100 | 50 | 60 | 40 | 50 | 50 | 60 | 50 | 60 | 40 | 50 | 50 | 75 | 75 | 75 | 75 |
| | 20 | 21 | 22 | 23 | 24 | 25 | 26 | 27 | 28 | 29 | 2A | 2B | 2C | 2D | 2E | 2F |
| Near | 35 | 60 | X | X | 35 | 50 | X | X | 35 | 60 | X | X | 35 | 60 | X | X |
| Mid | 60 | 60 | X | X | 75 | 50 | X | X | 100 | 100 | X | X | 100 | 100 | X | X |
| Far | 100 | 100 | X | X | 100 | 100 | X | X | 100 | 100 | X | X | 100 | 100 | X | X |
| | 30 | 31 | 32 | 33 | 34 | 35 | 36 | 37 | 38 | 39 | 3A | 3B | 3C | 3D | 3E | 3F |
| Near | X | X | X | X | X | X | X | X | X | X | X | X | X | X | X | X |
| Mid | X | X | X | X | X | X | X | X | X | X | X | X | X | X | X | X |
| Far | 100 | 100 | X | X | 100 | 100 | X | X | 100 | 100 | X | X | 100 | 100 | X | X |

In the look-up table shown in Table 3, each column represents as indicated a different value of the confidence label denoted in hexadecimal form with bit 8 representing the most significant bit and bit 1 representing the least significant bit. Each row represents the label of the cell matrix under consideration, i.e., either "near", "mid", or "far". Each entry in the table represents a matching weight which has been derived empirically based on the study of the combination. The system then determines which is larger, the 30% of the maximum peak amplitude or 400. The system then determines the minimum peak amplitude of all the strikes in the combination and identifies the corresponding strike as a potential outlier. Next, the system subtracts the minimum peak amplitude from next largest peak amplitude of all the strikes in the combination (the next largest peak amplitude representing the strike which is immediately adjacent the potential outlier). If the difference between the peak amplitude of the potential outlier and the peak amplitude of the immediately adjacent strike is greater than the maximum of 30% of the maximum peak amplitude and 400, the potential outlier is considered to be in fact an outlier. In other words, if:

$$\max[0.30*\text{max.peak amp.}, 400] < \text{peak amp. diff. between potential outlier and next closest strike,}$$

where "max" is the maximum operator, then the combination of strikes is considered to produce an outlier. As a result, the matching weight obtained from the look-up table (Table 3) is reduced in block 356 by 40 for the particular cell matrix under comparison. The outlier test is performed with respect to all possible matches between the strike matrix and one of the cell matrices. Again, then, the system proceeds to block 358 in which the maximum matching weight with respect to the different cell matrices is determined.

Figure 7:
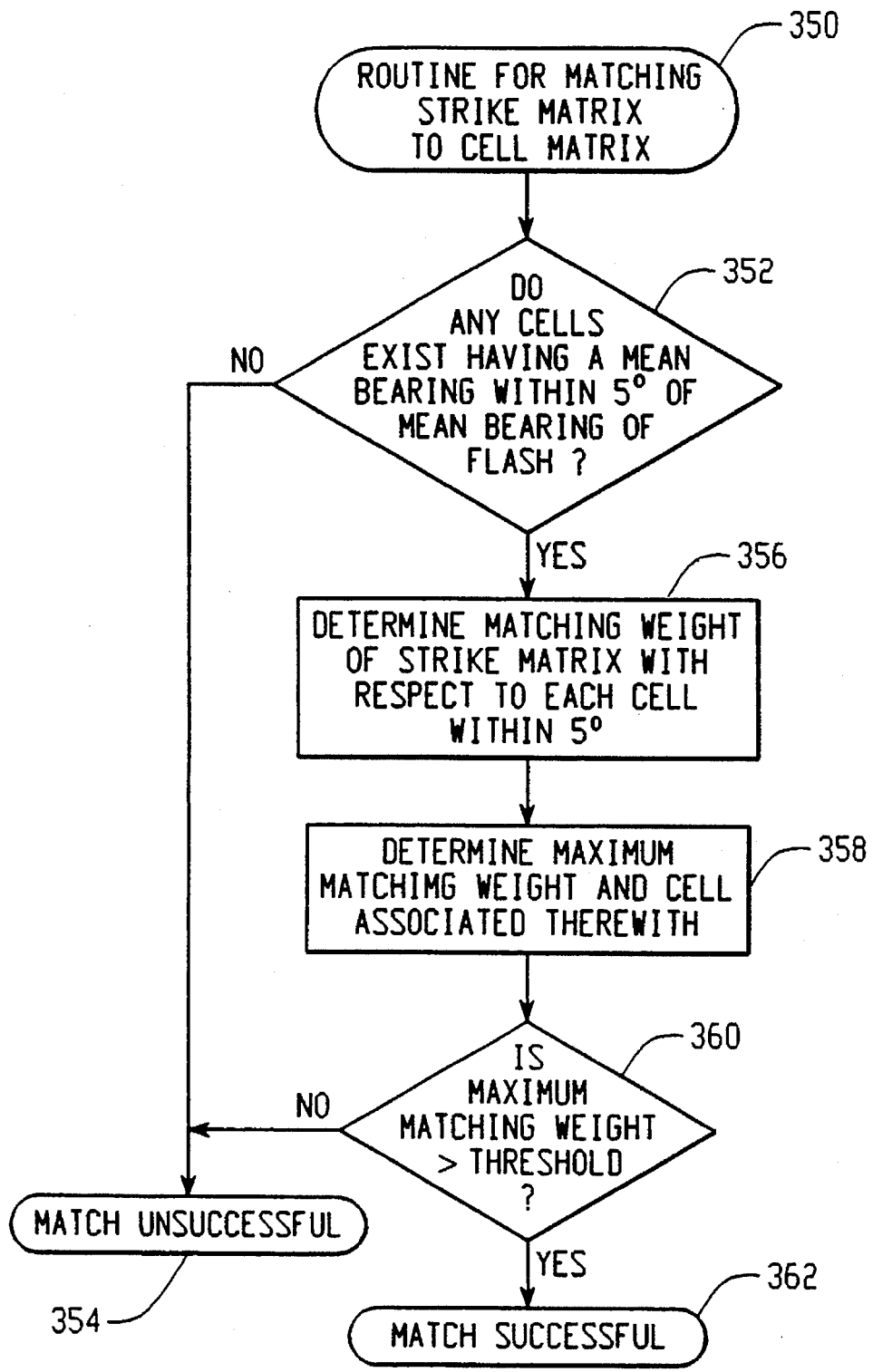
FIG. 7 is a software flow chart suitable for programming the system to determine whether a strike matrix can be matched to an existing cell.
Figure 8:
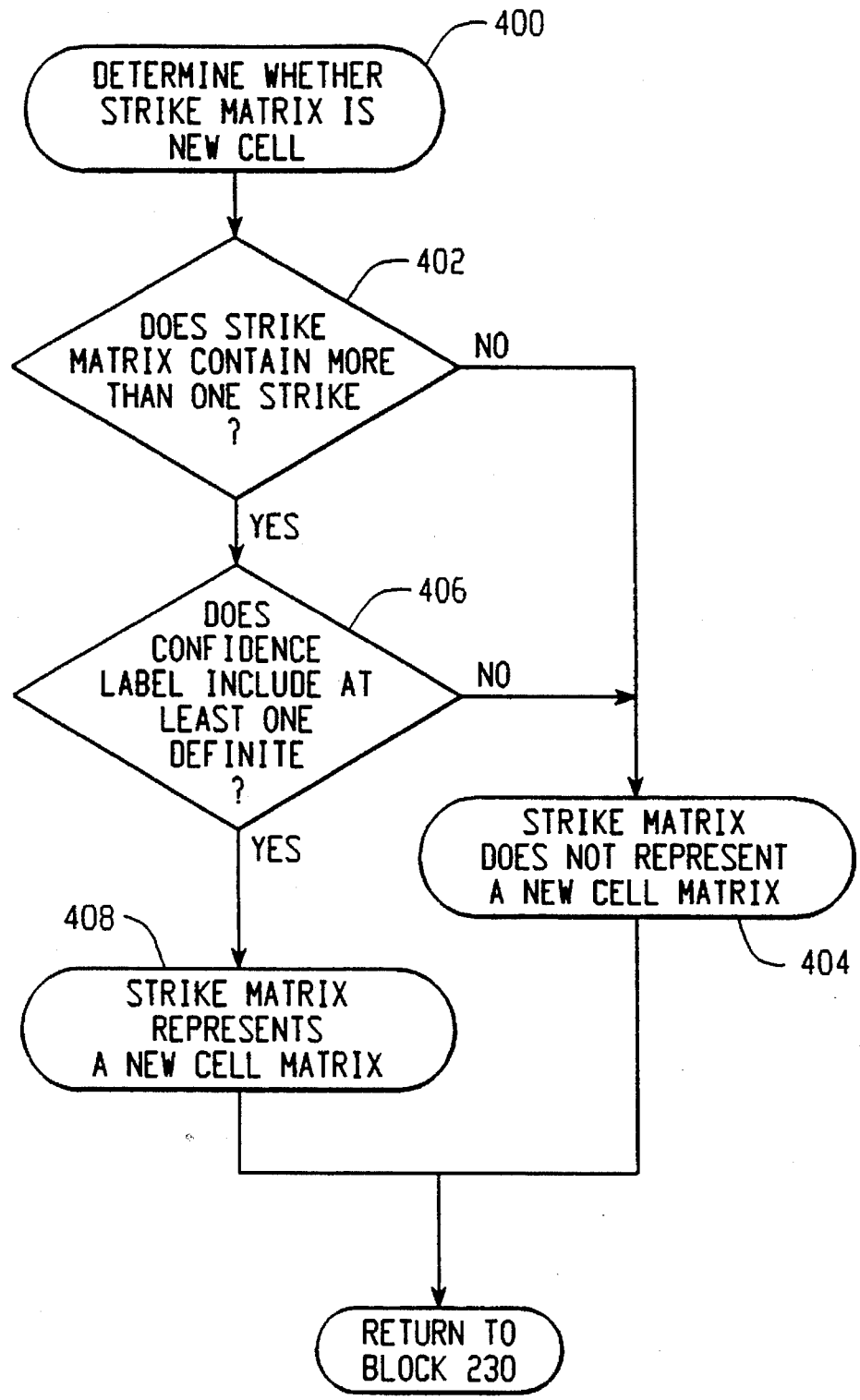
FIG. 8 is a software flow chart suitable for programming the system to determine whether a strike matrix represents a new cell.

Referring back to FIG. 4, the system checks in block 213 whether the match was successful as determined according to the steps described with respect to FIG. 7. If the match was unsuccessful, the system proceeds to block 230 to determine if the strike matrix represents a new cell. FIG. 8 illustrates the procedure for making such a determination in accordance with the exemplary embodiment beginning at block 400. More particularly, in block 402 the system checks whether the strike matrix includes more than one strike. If not, the system proceeds to block 404 in which it is concluded that the strike matrix does not represent a new cell. Thus, in accordance with the present invention, a new cell will not be created unless two or more strikes occur within the same flash. If in block 402 the system determines that the strike matrix does include more than one strike, the system proceeds to block 406 in which the system checks to see whether the confidence label for the strike matrix includes at least one definite, e.g. at least one of the definite-near, definite-mid or definite-far bits (bits 2, 4 and 6, respectively) has been set to one in block 210 (FIG. 4). If not, the system does not consider the location of the strike matrix to be sufficiently definite to form the basis for a new cell and the system proceeds to block 404. If, on the other hand, the confidence label includes at least one definite, the system considers the strike matrix to be sufficiently definite to form the basis for a new cell matrix and the system proceeds to block 408. Following both blocks 404 and 408, the system returns to block 230 of FIG. 4.

If the strike matrix was found not to represent a new cell in block 230, the system proceeds directly to block 221 in which the DSP 46 clears all the strikes from the strike matrix. If in block 230, on the other hand, the strike matrix is found to represent a new cell, the system via the control processor 70 creates a new cell matrix in the system memory corresponding to the new cell. The system stores in the new cell matrix the strike data from the strike matrix (i.e. bearing data, SRC, TOA, peak amplitude, and confidence label information). The strike rate data for each strike in the newly formed cell matrix is calculated by the system based on the total number of strikes in the cell matrix divided by the time elapsed between the earliest strike TOA and the most recent strike TOA. The estimated range of the cell represented by the cell matrix is left blank for the time being with respect to each strike. The system then proceeds from block 232 to block 217, as is shown in FIG. 4, whereat the newly created cell matrix is updated with a cell matrix label as is described below with respect to FIGS. 9A–9D.

Continuing to refer to FIG. 4, in the event the strike matrix is successfully matched to an existing cell as determined in block 213, the system proceeds to block 215 whereby the strikes in the strike matrix are added to the matching cell matrix. At such time, the strike rate for the cell matrix is computed including the newly added strikes. Again, the strike rate is calculated by dividing the total number of strikes in the cell matrix by the elapsed time between the earliest strike TOA and the most recent strike TOA. The strike rate is then stored in the cell matrix with respect to those strikes which were newly added. In this manner, the strike rate for each strike in the cell matrix represents the strike rate activity in the cell at the time which the strike was added to the cell matrix. The strike rate for the most recent strike in the cell matrix will therefore represent the current strike rate for the cell matrix.

After the strikes from the strike matrix have been combined with the existing strikes in the cell matrix, the system proceeds to block 217 in which it updates the cell matrix label. As was mentioned above, each cell matrix has associated therewith a label which categorizes the cell as representing either a near, mid or far thunderstorm cell. Referring to FIGS. 9A–9D, the process for updating the cell matrix label will now be described beginning with block 450. In block 452, the system determines whether the cell matrix includes less than 20 strikes. If yes, the system proceeds to block 454 in which the system checks whether the strike matrix includes more than one strike. If not, the system proceeds to block 456 in which the label of the cell matrix is left unchanged. As a result, a strike matrix which includes only a single strike will not result in the label of the cell matrix matched therewith being changed. Therefore, the system returns to block 217 (FIG. 4).

On the other hand, if in block 454 it is found that the strike matrix does include more than one strike, the system proceeds to block 458 in which the system checks the strike matrix confidence label to determine if the strike matrix has been categorized within a single class. More particularly, the system checks the strike matrix confidence label to identify whether only near bits have been set, or only mid bits have been set, or in the alternative, if only far bits have been set. In other words, the system checks to see whether the confidence label corresponds exclusively to one of the following conditions:

1. Maybe near (bit 1 set)
2. Definitely near (bit 2 set)
3. Maybe near, definitely near (bits 1 and 2 set)
4. Maybe mid (bit 3 set)
5. Definitely mid (bit 4 set)
6. Maybe mid, definitely mid (bits 3 and 4 set)
7. Maybe far (bit 5 set)
8. Definitely far (bit 6 set)
9. Maybe far, definitely far (bits 5 and 6 set)

If in block 458 the strike matrix is found to be categorized within a single class, the system proceeds to block 450 whereby the system updates the cell matrix label to be the same single class described in the confidence label for the strike matrix. For example, if the strike matrix had a confidence label of "maybe mid/definitely mid", the cell matrix label in block 460 would be set to "mid". This cell matrix label serves as a tag stored with the cell matrix in the system memory. Thereafter the system returns to block 217.

Referring again to block 458, it is possible that the confidence label of the strike matrix will categorize the strike matrix across two or more classes, for example, "definitely mid/maybe mid/maybe far" or "maybe near/definitely mid/maybe far", etc., depending upon how the strike matrix is categorized in the process shown in FIGS. 6A and 6B. If the strike matrix is not categorized within a single class as determined in block 458, the system proceeds to block 464 in which it determines whether the strike matrix is categorized within two classes exclusively with at least one "definite" classification. In other words, the system checks whether the strike matrix confidence label includes only two classes (i.e., a combination of near-mid or mid-far) with at least one definite (i.e., a definitely near, definitely mid or definitely far). If yes, the system proceeds to block 466 in which the control processor 70 calculates the appropriate crossover label weights $\theta_{near-mid}$, $\theta_{mid-far}$, $r_{near-mid}$ and $r_{mid-far}$ for the cell matrix as follows:

$$\theta_{near-mid} = 1/2 * \tan\left(\frac{\min[\sigma_\theta - 9°, 9° * 2]}{9° * 8/\pi}\right)$$

$$\theta_{mid-far} = 1/2 * \tan\left(\frac{\min[\sigma_\theta - 5°, 5° * 2]}{5° * 8/\pi}\right)$$

$$r_{near-mid} = 1/2 * \tan\left(\frac{\min[maxamp - 500, 2*500]}{500*8/\pi}\right)$$

$$r_{mid-far} = 1/2 * \tan\left(\frac{\min[maxamp - 225, 2*225]}{225*8/\pi}\right)$$

where "min" represents the minimum operator, "$\sigma_\theta$" represents the standard deviation in the bearings $\theta$ for all the strikes included in the cell matrix, and "maxamp" represents the maximum peak amplitude of the strikes included in the cell matrix.

If the strike matrix is categorized by the confidence label which bridges across the near and mid classes, the system calculates the crossover bearing weight $\theta_{near-mid}$ and range weight $r_{near-mid}$. On the other hand, if the strike matrix is categorized across the mid and far classes, the system calculates the value of the crossover bearing weight $\theta_{mid-far}$ and range weight $r_{mid-far}$.

The crossover label weights calculated in block 466 are based on respective tangent curves exemplified in FIG. 9E. Through empirical studies of archived data, it has been found that a threshold of $\sigma_\theta=9°$ provides a useful division between "near" and "mid" classification. As will be appreciated, the further away the thunderstorm cell, the smaller the standard deviation of $\theta$ is likely to be. Similarly, a threshold of $\sigma_\theta=5°$ has been found to provide a useful division between a "mid" and "far" classification. The range crossover label weights use a 500 peak amplitude threshold between "near" and "mid" and a 225 peak amplitude threshold between "mid" and "far". However, the particular threshold values and the tangent curves are provided only as a preferred and exemplary way for computing the crossover label weights. It will be appreciated that other techniques, for example linear curves and different threshold values, can be used without departing from the scope of the invention.

Figure 9A:
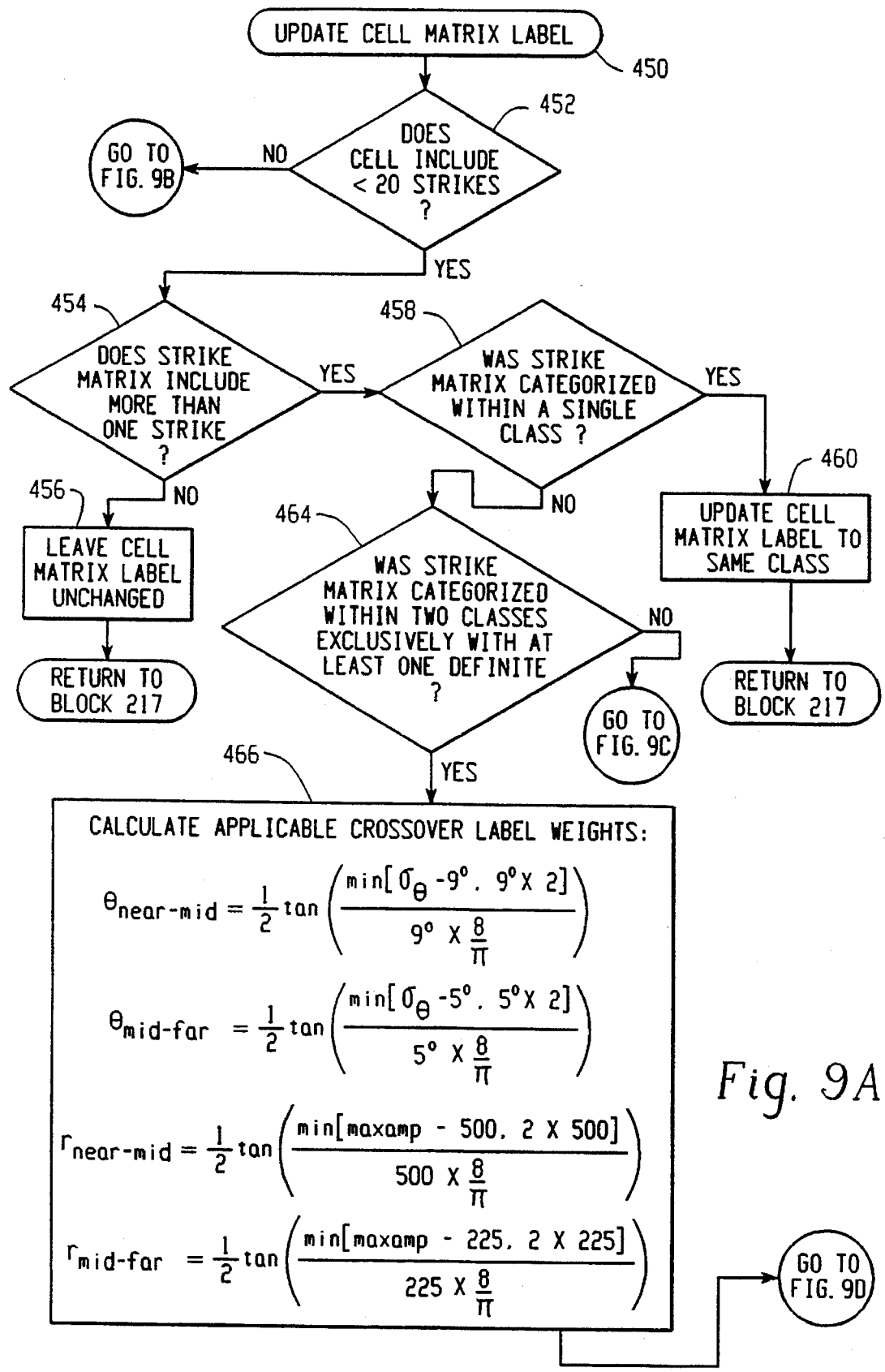
FIGS. 9A–9D represent a software flow chart suitable for programming the system to update the label of the cell matrix following the addition of strikes from the strike matrix in accordance with the present invention.
Figure 9B:
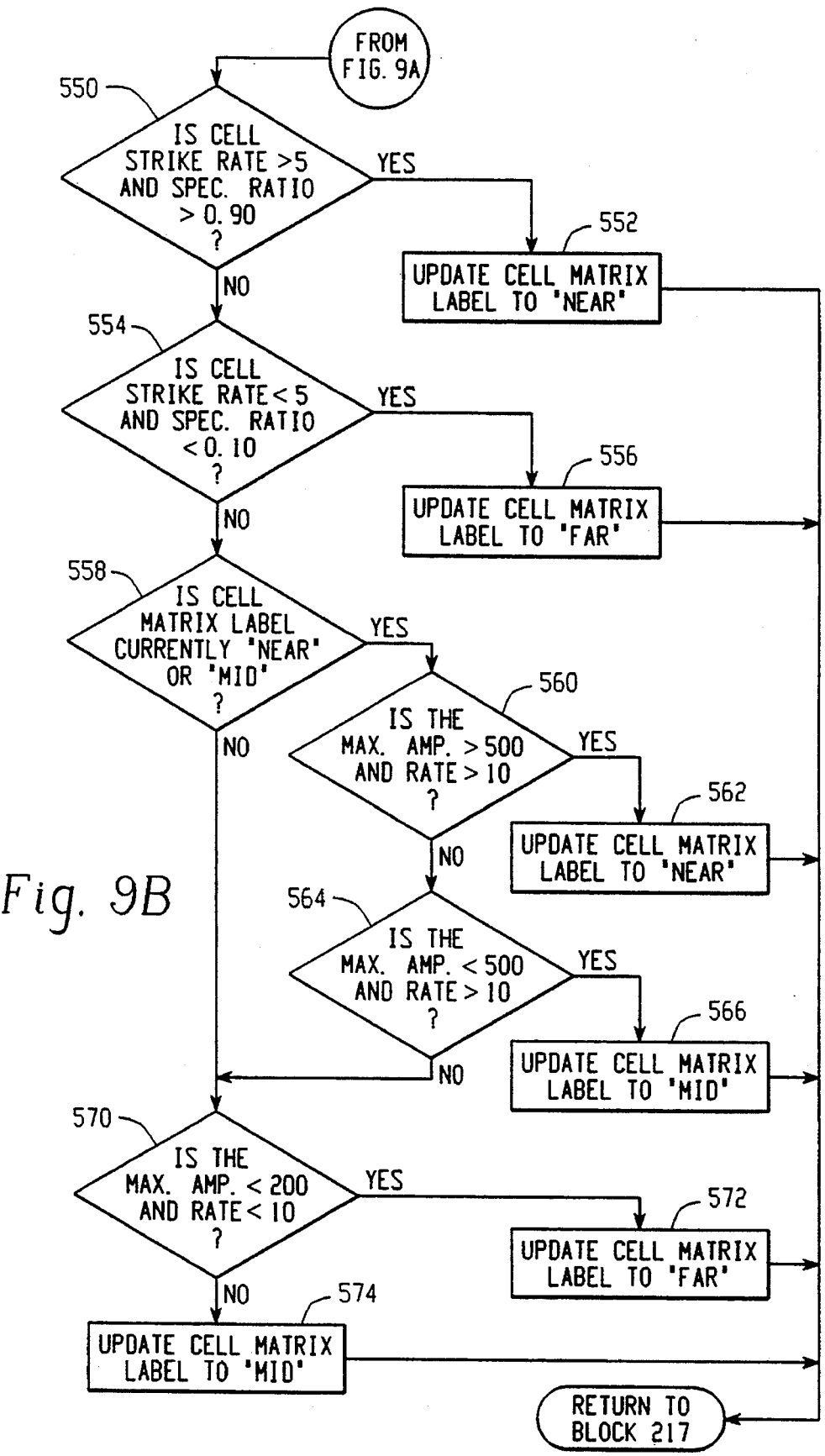
Figure 9C:
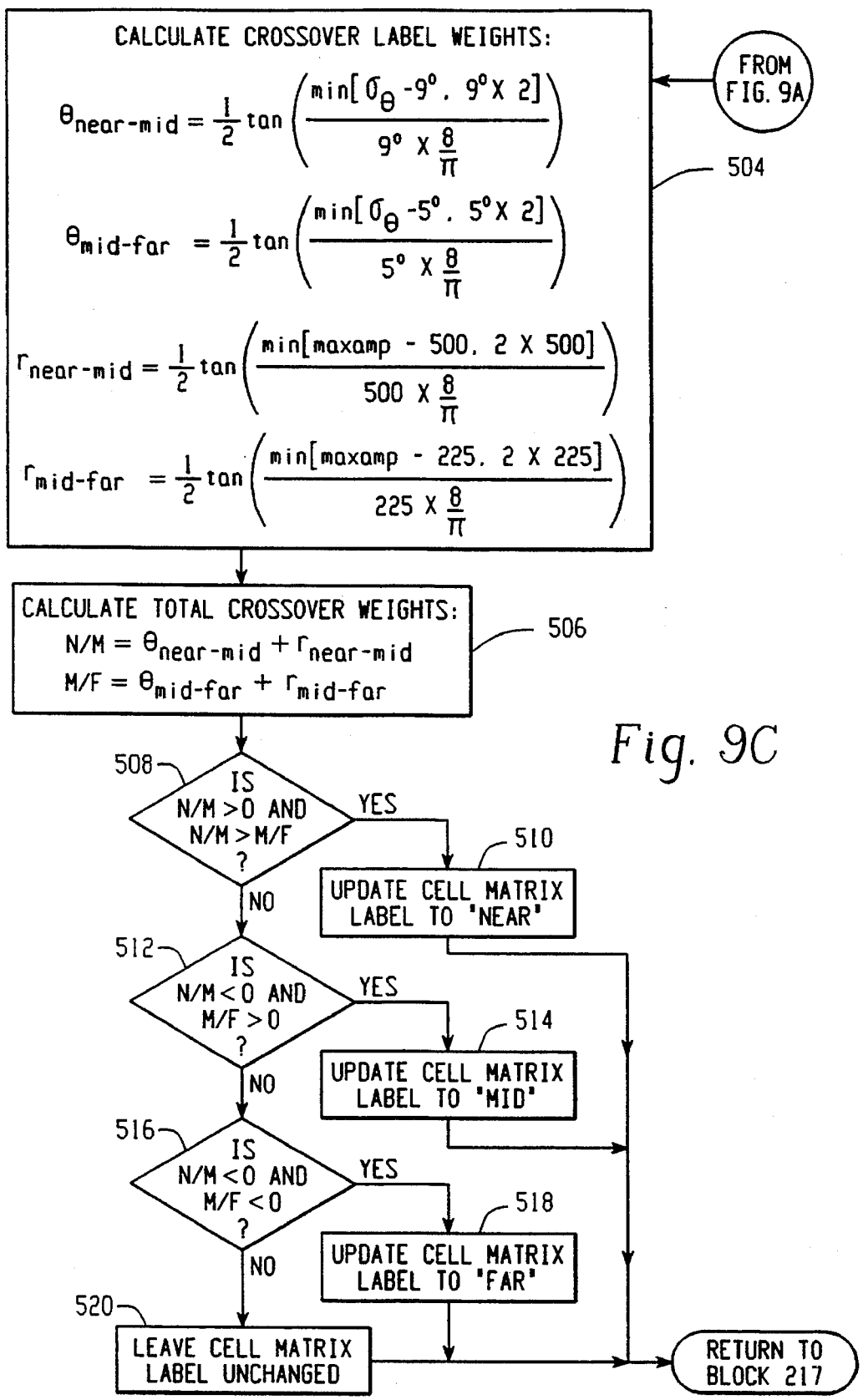
Figure 9D:
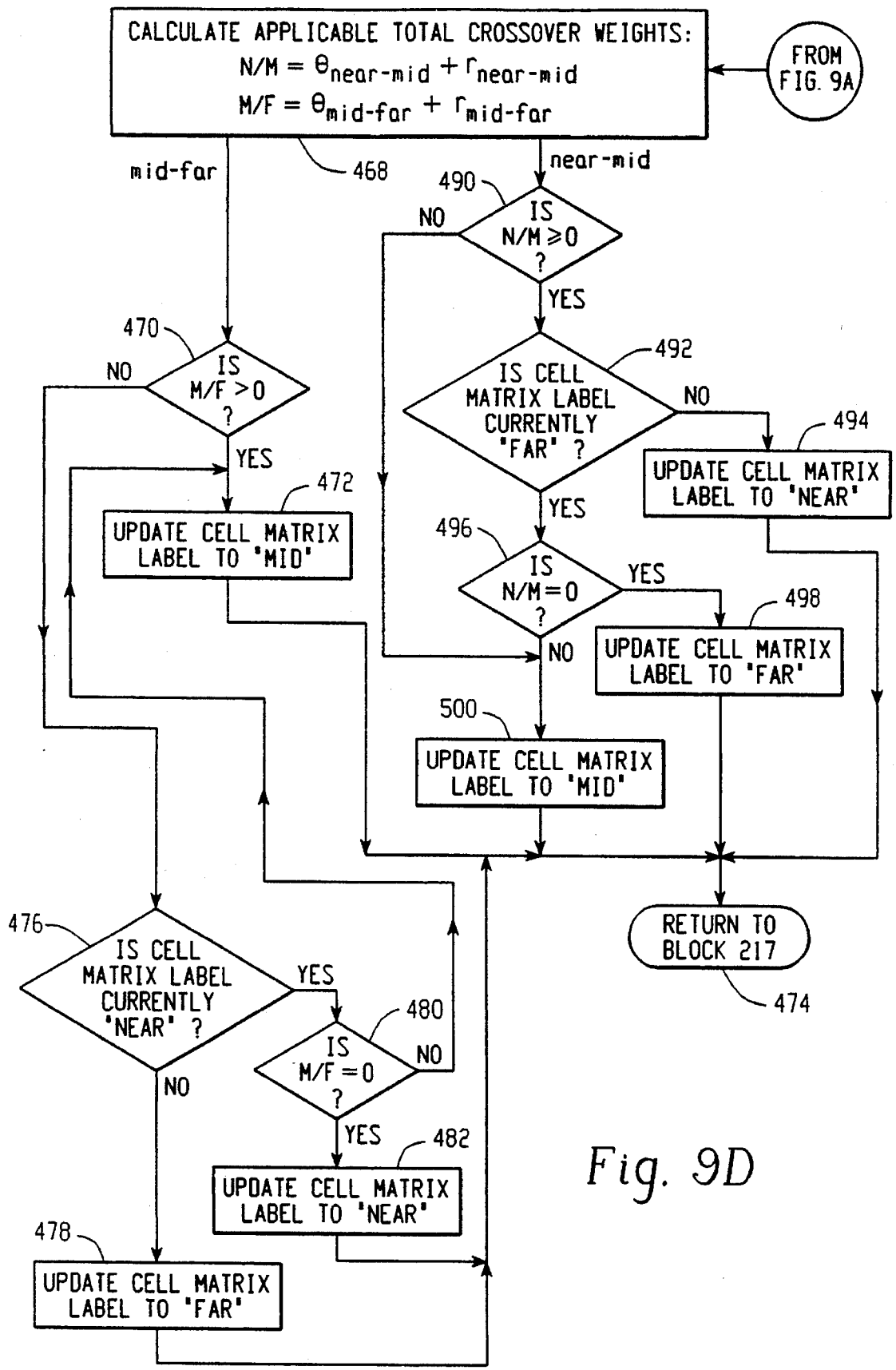

Following block 466, the system proceeds to block 468 as shown in FIG. 9D in which the applicable total crossover weight N/M (for a near-mid crossover) or M/F (for a mid-far crossover) is calculated as follows:

$$N/M = \theta_{near-mid} + r_{near-mid}$$

$$M/F = \theta_{mid-far} + r_{near-far}$$

Next, in the event the crossover occurs between mid and far, the system proceeds to block 470 in which the system checks whether the value of the total crossover weight M/F is greater than 0. If yes, the total crossover weight M/F indicates that a "mid" label is appropriate and the system updates the cell matrix label to "mid" in block 472. Thereafter, the system proceeds to block 474 in which the system returns to block 217 in FIG. 4.

If in block 470 M/F is not greater than 0, this suggests that the cell matrix label should be "far". Thus, the system proceeds to block 476 in which the system checks if the cell matrix label is currently "near". If it is not, the system proceeds to block 478 in which the system updates the cell matrix label to "far". On the other hand, if in block 476 the cell matrix label is currently "near", the system is programmed to prohibit the cell label from being changed directly to "far", and the system instead proceeds to block 480 in which the system determines whether M/F is equal to 0. If yes, the cell is considered to remain "near" and the system updates the cell label accordingly in block 482. Otherwise, if M/F does not equal 0, the system in block 472 identifies the cell as being "mid" and updates the cell matrix label accordingly.

Referring back to block 468, if the crossover in the strike matrix confidence label occurs between near and mid, the system continues to block 490 in which it is determined if the total crossover weight N/M is greater than or equal to 0. If yes, this suggests the cell label should be "near" the system proceeds to block 492 in which the system checks whether the cell matrix label is currently "far". If it is not, the system in block 494 updates the cell matrix label to "near". Otherwise, if the total crossover weight N/M is greater than or equal 0 but the cell matrix label is currently "far" in block 492, the system again will not allow the cell label to be updated directly to the other extreme, or "near", and the system instead checks in block 496 whether the total crossover weight N/M is equal to 0. If yes, the system in block 498 updates the cell matrix label to "far", i.e., leaves the cell matrix label unchanged. Alternatively, if in block 496 N/M is not equal to 0, the system will update the cell matrix label from "far" to "mid" in block 500. Following each of blocks 472, 478, 482, 494, 498 and 500, the system returns to block 217 in FIG. 4.

Referring again to block 464 in FIG. 9A, in the event the confidence label of the strike matrix categorizes the strike matrix across all three classes (near, mid and far), or if the confidence label includes two or more "maybes" but no "definites", the confidence label is considered to be inconclusive. For example, confidence labels of 14 (hex) and 29 (hex) are considered to be inconclusive. As a result, the system proceeds to block 504 as shown in FIG. 9C in which the crossover label weights $\theta_{near-mid}$, $\theta_{mid-far}$, $r_{near-mid}$ and $r_{mid-far}$ are each calculated for the cell matrix using the same equations provided above with respect to block 466.

In block 506, the system calculates both the total crossover weights N/M and M/F using the same equations provided above with respect to block 468. Next, in block 508 the system checks whether N/M is greater than 0 (suggesting "near") and N/M is greater than M/F (further suggesting "near"). If so, the cell matrix is considered to represent a near thunderstorm cell and the system updates the cell matrix label accordingly in block 510. Otherwise, the system proceeds from block 508 to block 512 in which the system determines if the total crossover weight N/M is less than 0 (suggesting "mid") and M/F is greater than 0 (further suggesting "mid"). If so, the system proceeds to block 514 in which the system updates the cell matrix label to "mid" If the conditions of block 512 are not satisfied, the system proceeds to block 516 in which the system checks whether the value of N/M is less than 0 (suggesting more "mid" than "near") and the value of M/F is less than 0 (suggesting "far"). If so, this indicates that the cell matrix represents a far thunderstorm cell and the system updates the cell matrix label accordingly in block 518. If the conditions of block 516 are not satisfied, the cell matrix label is left unchanged in block 520, and the system returns to block 217 in FIG. 4. On the other hand, if the conditions of block 516 are not satisfied but the cell matrix being updated represents a new cell and is therefore previously unlabelled, the cell matrix label is set to "mid" in block 520.

Again referring back to FIG. 9A, if it is determined in block 452 that the cell matrix includes 20 or more strikes, the system proceeds directly to block 550 in FIG. 9B. If the cell matrix includes at least 20 strikes, the system updates the cell matrix label based on a different criteria which makes use of the larger sample of data available from the strikes. Specifically, in block 550 the control processor 70 calculates whether the strike rate in the cell is greater than five strikes per minute and the spectral density ratio SDR for the cell matrix is greater than 0.90, such values being calculated as described above. If both these conditions are satisfied, this indicates a fairly large number of lightning strikes received from the thunderstorm cell and which have a relatively large high frequency content. These characteristics are typical of a near thunderstorm cell which undergoes relatively little path loss. As a result, the system proceeds to block 552 in which the system updates the cell matrix label to "near". Otherwise, the system proceeds to block 554 in which the system determines whether the strike rate of the cell is less than 5 strikes per minute and the spectral density ratio SDR is less than 0.10. If the conditions of block 554 are satisfied, this indicates that relatively few strikes are being received and that such strikes have a fairly low high frequency content, thus suggesting that the thunderstorm cell is located far away. Accordingly, the system proceeds to block 556 in which the system updates the cell matrix label to "far".

If, on the other hand, the conditions in block 554 are not satisfied, the system proceeds to block 558 in which it is checked whether the cell matrix label is currently "near" or "mid". If yes, the system in block 560 checks whether the maximum peak amplitude of the strikes included in the strike matrix is greater than 500 and the current strike rate for the cell matrix is greater than 10 strikes per second. Such conditions indicate a relatively high rate of strikes being received from the thunderstorm cell at relatively high amplitude levels, thereby suggesting a near thunderstorm. Thus, if the conditions in block 560 are satisfied the system proceeds to block 562 in which the cell matrix label is updated to "near". Otherwise, the system proceeds from block 560 to block 564 in which the system checks whether the maximum peak amplitude of the strikes included in the cell matrix is less than 500 and the rate is greater than 10 strikes per minute. These conditions suggest a relatively high number of strikes being received from the strike matrix although not at high amplitudes, thus suggesting a thunderstorm cell which is mid-ranged. Accordingly, if the conditions of block 564 are satisfied the system proceeds to block 566 wherein it updates the cell matrix label to "mid".

If in either blocks 558 or 564 the respective conditions are not satisfied, the system proceeds to block 570 as is shown. In block 570, the system determines whether the maximum peak amplitude of the strikes included in the cell matrix is less than 200 and the strike rate is less than 10 strikes per minute. If so, this indicates that relatively few strikes are being received from the thunderstorm cell and they are all at relatively low amplitudes, thereby indicating a thunderstorm cell which is located further away. As a result, in block 572 the system updates the cell matrix label to "far". Otherwise, the system proceeds from block 570 directly to block 574 in which it is concluded that the thunderstorm cell represented by the cell matrix is located somewhere in a mid-range. Accordingly, the cell matrix label is updated to "mid" in block 574.

Figure 10A:
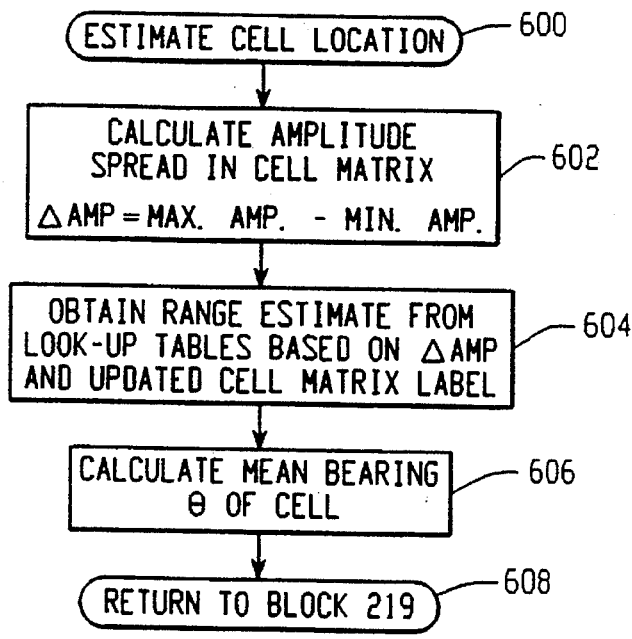
FIG. 10A represents a software flow chart suitable for programming the system to estimate the location of the cell from the cell matrix in accordance with one embodiment of the present invention.

Thus, it will be appreciated that after the strikes from a strike matrix have been added to a matching cell matrix or have been used to create a new cell matrix, the system updates the label of the cell matrix to reflect the location of the thunderstorm cell as represented by the cell matrix. This information is then used by the system to estimate the range and bearing of the thunderstorm cell (block 219 in FIG. 4) as follows. Referring to FIG. 10A, an exemplary procedure for estimating the range and bearing of the thunderstorm cell based on the contents of the cell matrix and the cell matrix label is shown beginning with block 600. In block 602, the control processor 70 calculates the peak amplitude spread $\Delta AMP$ for the cell matrix as follows:

$$\Delta AMP = maxamp - minamp$$

wherein "maxamp" and "minamp" represent the maximum peak amplitude and minimum peak amplitude, respectively, of the strikes included in the cell matrix.

Next, the system proceeds to block 604 in which a look-up table stored in system memory is used to provide a range estimate for the thunderstorm cell based on the value of $\Delta AMP$ and the updated cell matrix label. Specifically, stored within the system memory is a look-up table of empirical based values such as that shown below in Table 4.

TABLE 4

| Range Estimates (statute miles) | | | | | | | | |
|---|---|---|---|---|---|---|---|---|
| | $\Delta AMP$ | | | | | | | |
| | 400 | 500 | 600 | 700 | 800 | 900 | 1000 | >1000 |
| Near | 50 | 30 | 22 | 13 | 8 | 6 | 4 | 1 |
| | $\Delta AMP$ | | | | | | | |
| | 100 | 150 | 200 | 250 | 300 | 350 | 400 | >400 |
| Mid | 150 | 125 | 105 | 88 | 80 | 70 | 52 | 44 |
| Far | 240 | 220 | 175 | 167 | 153 | 131 | 105 | 87 |

As can be seen, each column in the look-up table represents the value of $\Delta AMP$ and each row represents the cell matrix label for the cell matrix under consideration. For a given $\Delta AMP$ value and cell matrix label, the system selects the corresponding value from the look-up table, the values in the look-up table being represented in statute miles. The system uses interpolation to obtain the exact range estimate from the table using conventional techniques. As an example of using the look-up table in block 604, suppose the cell matrix label is "far" and $\Delta AMP$ for the cell matrix is equal to 200. In such case, the range of the thunderstorm cell represented by the cell matrix is estimated to be 175 statute miles. The particular values included in the look-up table are again based on empirical studies of lightning strike data and have been found to provide optimum results. However, it will be appreciated that other values in the look-up table can be used without departing from the scope of the present invention.

Following block 604, the estimated bearing of the thunderstorm cell as represented by the cell matrix is calculated in block 606. In particular, the system calculates the mean bearing θ of the cell by calculating the average value of θ for all of the strikes included in the cell matrix. As a result, blocks 604 and 606 provide the estimated range and bearing of the thunderstorm cell as represented by the particular cell matrix. The system then proceeds to block 608 and returns to block 219 in FIG. 4.

Figure 10B:
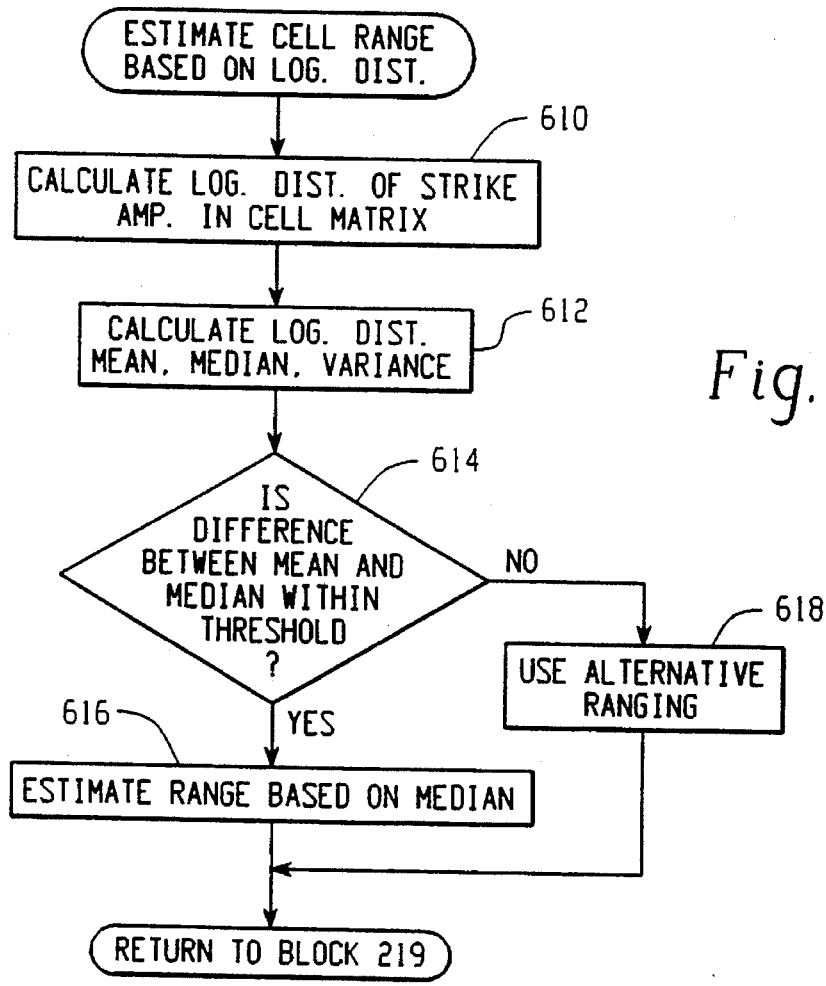
FIG. 10B is a software flow chart suitable for programming the system to estimate the location of the cell in accordance with another embodiment of the present invention.

FIG. 10B shows another approach for estimating the range of thunderstorm cell represented by a cell matrix based on a distribution of the logarithms of the peak amplitudes included in the respective cell matrix. Specifically, in block 610 the base 10 logarithm of each of the peak amplitudes of the strikes included in the given cell matrix is calculated and the frequency distribution of these log amplitudes, i.e., the logarithmic distribution, is determined via the control processor 70. In block 612, the system calculates the mean and median of the logarithmic distribution of the strike amplitudes. In block 614, the system checks whether the difference between the mean and median of the logarithmic distribution is within a predetermined threshold, such as 0.1, so as to indicate that the strike amplitudes tend to follow a Gaussian or logarithmic-normal distribution. It has been found that lightning strikes originating from the same thunderstorm cell tend to exhibit peak amplitudes having a logarithmic-normal distribution. Accordingly, if the difference between the mean and median are within a predetermined threshold as determined in block 614, the system proceeds to block 616 in which the system estimates the range based on the median of the logarithmic distribution as follows:

$$\text{Estimated Range} = \frac{k}{10^{(\text{median of logarithmic distribution})}},$$

wherein k is a constant.

If the conditions in block 614 are not satisfied, thereby indicating that the peak strike amplitudes in the cell matrix do not follow a log-normal distribution, the system uses an alternative ranging approach in block 618 such as the look-up table based approach described above in connection with FIG. 10A. After blocks 616 and 618, the system returns to block 219 in FIG. 4 as is shown. It is noted that the logarithmic ranging approach described in FIG. 10B is preferably carried out only with respect to cell matrices having at least twenty strikes included therein. Fewer than twenty strikes could be used, although it is less preferred due to the limited number of strikes by which to form the logarithmic distribution.

Following block 219, the system clears the strike matrix in block 221 as mentioned above. The system then updates the display 130 (FIG. 2) such that the system displays the thunderstorm cells represented by the different cell matrices maintained in the system memory. As is exemplified in FIG. 3, the thunderstorm cells are plotted based on the estimated range and bearing calculated in block 219. In the exemplary embodiment, each thunderstorm cell is displayed as a circle with a fixed diameter and having its center located at the estimated range and bearing for that cell as determined from the corresponding cell matrix. However, it will be appreciated that in another embodiment, the individual strikes in the cell matrix which make up the cell may be plotted in addition to identifying the center of the cell. In either case, it will be readily apparent from the display exactly where the centers of the thunderstorm cells are located.

Figure 11:
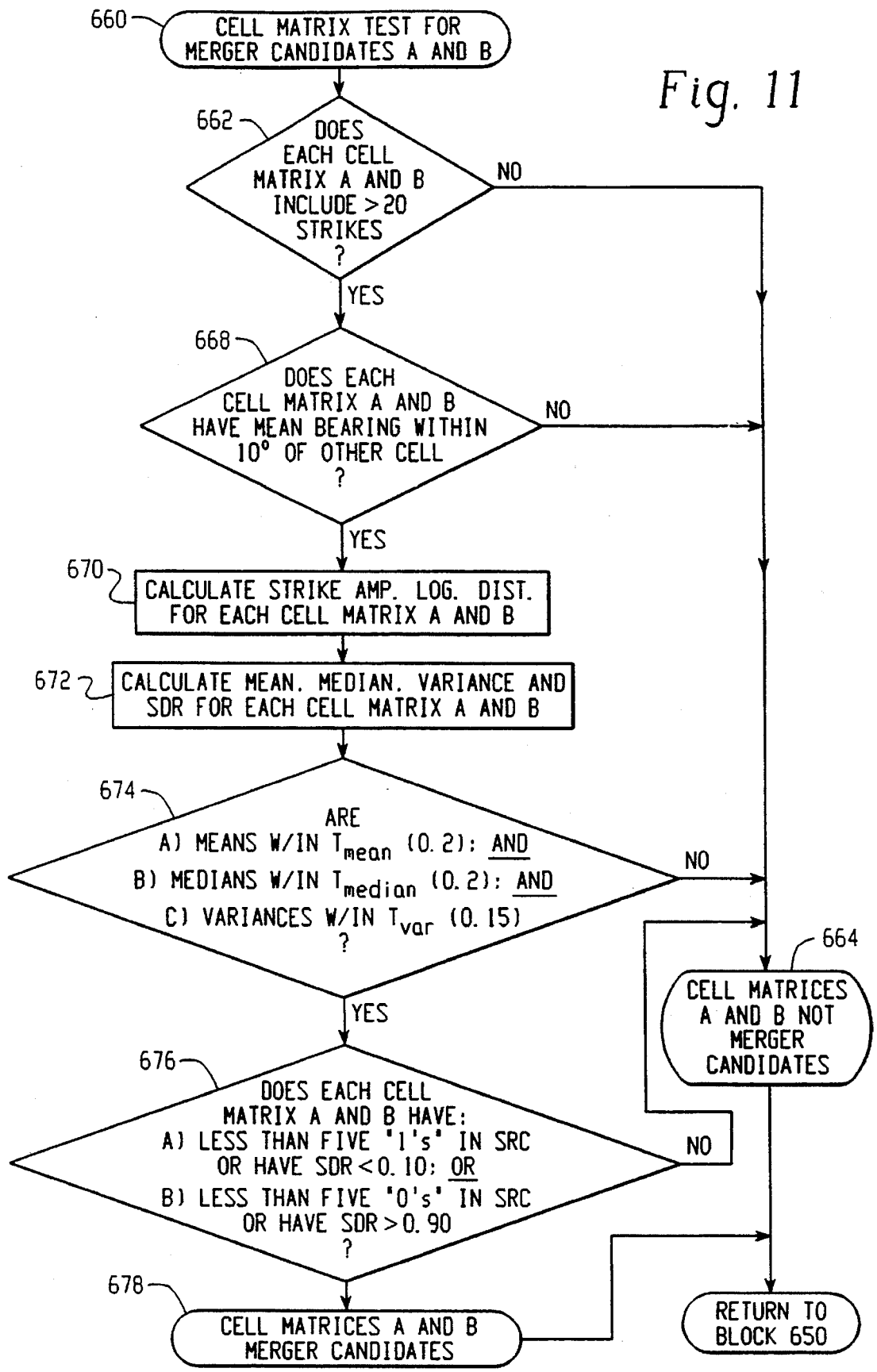
FIG. 11 represents a software flow chart suitable for programming the system to test whether two or more cell matrices can be merged in accordance with the present invention.

Referring now to FIG. 4A, the system in accordance with the present invention includes a cell management program for substantially continuously analyzing whether thunderstorm cells represented by existing cell matrices in the system memory can be merged or combined. For example, in block 650, the system compares all of the thunderstorm cells represented by the cell matrices in the system memory with each other and determines, according to a predetermined criteria, whether any two cells can be merged together and treated as a single cell as is represented in block 652. This comparison process is described in more detail in FIG. 11 beginning with block 660. According to the exemplary embodiment of the present invention, the system compares each possible pair of cell matrices (represented generally herein by matrices A and B) stored within the system memory to determine whether the cell matrices A and B can be combined. Specifically, in block 662 the system checks whether each cell matrix A and B includes more than 20 strikes. If not, cell matrices A and B are considered in block 664 not to be candidates for merger and the system returns to block 650 in FIG. 4. On the other hand, if each cell matrix A and B includes more than 20 strikes, the system proceeds to block 668 in which the control processor 70 determines if the strikes in each cell matrix A and B have an average bearing within 10 degrees of the average bearing of other cell matrix, indicating that the cell matrices are sufficiently close in bearing to possibly be merged. If the average bearings are not within 10 degrees, the system proceeds directly to block 664 where again the matrices are considered not to be merger candidates.

If the cell matrices have respective mean bearings within 10 degrees of each other, the system proceeds to block 670 in which the system calculates the logarithm of the peak amplitudes of the strikes in each of the matrices and thereafter determines the distribution of the logarithmic amplitudes, i.e., the logarithmic distribution of the peak amplitudes. The system calculates the logarithmic distribution for each of the cell matrices A and B individually. Then, in block 672, the system calculates the mean, median and variance of the logarithmic distributions for each cell matrix and the spectral density ratio SDR as described above for each cell matrix.

In block 674, the system determines whether the mean of the logarithmic distribution for each cell matrix is within a predetermined threshold $T_{mean}$ of each other (e.g., $T_{mean}$ equals 0.2); the respective medians are within a predetermined threshold $T_{median}$, (e.g., T median equals 0.2); and the variances are within a predetermined variance threshold $T_{var}$ of each other (e.g. $T_{var}$ equals 0.15). If so, this suggests that the lightning strikes in each of the respective matrices follow the same distribution, making it more probable that they are originating from the same thunderstorm cell. Thus, if the conditions in block 674 are satisfied the system proceeds to block 676. Otherwise, the system proceeds to block 664 in which it is concluded that the cell matrices A and B are not candidates for a merger. In block 676, the system compares the number of spectral ratio components (SRC) set equal to "1" and "0" in each cell matrix A and B to determine whether the strikes in the cell matrices exhibit similar frequency properties. In particular, the system in block 676 determines whether either of the following conditions are satisfied with respect to each matrix A and B.

(a) Less than five "1's" in the SRC column or an SDR less than 0.10;

OR (b) Less than five "0's" in the SRC column or an SDR greater than 0.90.

If neither condition (a) nor condition (b) is satisfied for both matrices A and B in block 676, the system proceeds to block 664 and the cell matrices are not considered merger candidates. However, if either conditions of block 676 are satisfied for both matrices A and B, the system considers cell matrices A and B to be merger candidates as indicated in block 678. Following blocks 664 and 678, the system returns to block 650 in FIG. 4.

Figure 12:
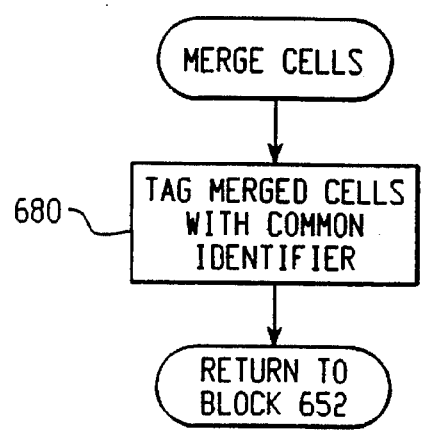
FIG. 12 is a software flow chart suitable for programming the system to merge two cells in accordance with the present invention.

In the event two cell matrices are considered candidates for merger in block 650, the system proceeds to block 652 in which the cells are merged. In the preferred embodiment, cells are merged in accordance with the procedure shown in FIG. 12. Specifically, in block 680 cell matrices A and B which are to be merged are tagged in the system memory by the system with a tag identifying the cells A and B with a common identifier. Thereafter, when the various procedures described above are carried out for matching a strike matrix and estimating the location of a thunderstorm cell, the merged cell matrices are treated as belonging to the same cell matrix. Thus, when calculations are performed based on maximum amplitude, the standard deviation in bearing, etc., these calculations are based on all the strikes included in all the cell matrices sharing a common identifier. It is noted that it is possible for additional cell matrices to be merged with cell matrices which have already been merged. In order to reduce processing time, however, a limitation may be placed on the merging of cells such that a cell which has been merged in the last 20 seconds, for example, cannot be merged with another cell.

Figure 13:
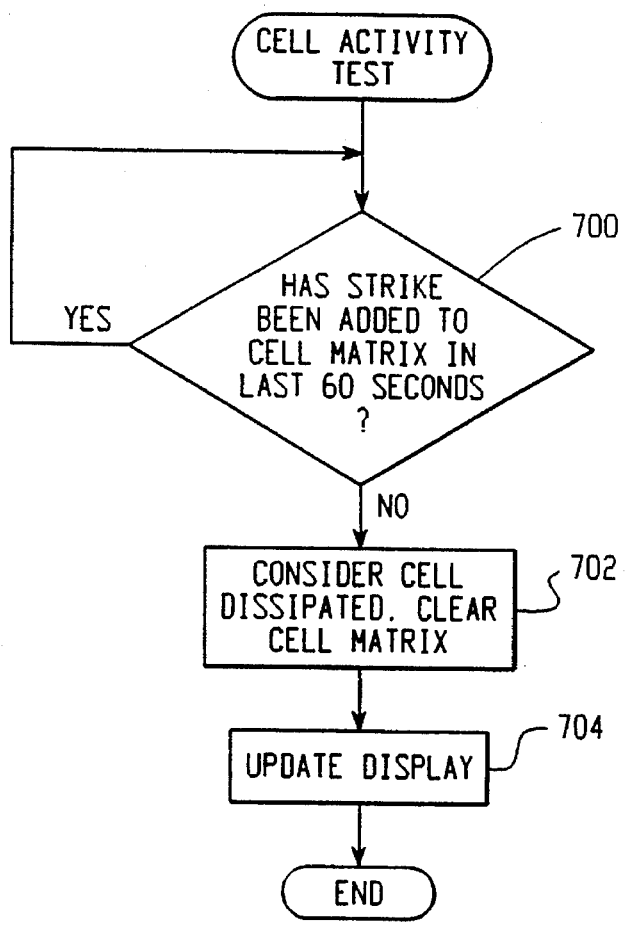
FIG. 13 is a software flow chart suitable for programming the system to test cell activity in accordance with the present invention.

FIG. 13 shows another cell management routine which is used by the system to test substantially continuously the activity of the respective cell matrices stored in the system memory and to determine if a thunderstorm cell associated therewith has dissipated. Specifically, in block 700 the system determines with respect to each of the cell matrices whether a strike has been added to the cell matrix in the last 60 seconds, for example. If yes, the system considers the cell matrix to continue to represent an active thunderstorm cell and the system remains within a loop around block 700. If in block 700 a new strike has not been added to a respective cell matrix in the last 60 seconds, the system considers the thunderstorm cell represented by the cell matrix to have dissipated as is represented in block 702. As a result, the system clears the cell matrix relating to the defunct thunderstorm cell from the system memory. Accordingly, when the display 130 (FIG. 2) is updated by the system in block 704, the defunct thunderstorm cell corresponding to the cell matrix which has been cleared will not appear on the display.

As a result, as the activity in the thunderstorm cells represented by the respective cell matrices dies down, the thunderstorm cells will be cleared from the display. In the meantime, new cell matrices corresponding to new thunderstorm cells will be created and displayed in the manner described above. Thus, the present invention provides a means to monitor continuously thunderstorm cells and to map the thunderstorm cells accurately to a display or the like. The display provides a clear indication of where the thunderstorm cells are centered and reduces the clutter on the display typically associated with plotting individual lightning strikes. The system according to the present invention clusters the lightning strikes automatically and associates the strikes with respective thunderstorm cells. The thunderstorm cells can then be ranged in real time based on a history of the lightning strikes associated therewith. As a result, improved thunderstorm cell detection and mapping is achieved.

The above description relates to a first preferred embodiment of a system for processing lightning strike data and locating active thunderstorm cells. A second preferred embodiment is described in detail in the aforementioned related U.S. Pat. No. 5,528,494 to R. L. Moses, entitled "Statistically-Based Thunderstorm Cell Detection and Mapping System", the disclosure of which has been incorporated herein by reference.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A thunderstorm cell detection and mapping system, comprising:

means for acquiring lightning strike information relating to locations of respective lightning strikes; and automated means for identifying and locating active thunderstorm cells including multiple lightning flashes based on said lightning strike information and a predetermined relationship among parameters associated with lightning strikes within a thunderstorm cell.

2. The system in accordance with claim 1, wherein said means for identifying and locating comprises means for processing said lightning strike information to cluster said lightning strikes into respective groups which are representative of said active thunderstorm cells.

3. The system in accordance with claim 2, wherein said means for processing clusters said lightning strikes into said groups based on a distribution of said lightning strike information.

4. The system in accordance with claim 2, wherein said means for identifying and locating estimates a location of each of said active thunderstorm cells based on said lightning strike information for said corresponding group of lightning strikes.

5. The system in accordance with claim 2, wherein said means for processing includes means for identifying new active thunderstorm cells based on lightning strikes which are not be clustered together with a group of lightning strikes corresponding to an existing active thunderstorm cell according to a predetermined criteria.

6. The system in accordance with claim 1, wherein said lightning strike information comprises strike amplitude and strike bearing information for each of said lightning strikes.

7. The system in accordance with claim 1, further comprising means for displaying the locations of said active thunderstorm cells.

8. The system in accordance with claim 2, said means for acquiring comprising strike matrix means for separating said lightning strike information into respective strike matrices that are representative of lightning strikes originating from a common flash, and wherein said means for processing is operative to process each of said strike matrices to cluster said lightning strikes included in said strike matrix into one of said groups.

9. The system in accordance with claim 8, wherein said lightning strikes represented in a given strike matrix occur within a predetermined time period and within a predetermined strike bearing of each other.

10. The system in accordance with claim 8, wherein said means for identifying and locating comprises means for developing a confidence label as part of each of said strike matrices, said confidence label being indicative of an expected location of said flash represented by said strike matrix, and said means for processing processes said strike matrices based on said confidence labels.

11. The system in accordance with claim 10, wherein said confidence label is indicative of said flash being located at least one of near, mid or far relative to a system origin.

12. The system in accordance with claim 10, wherein said confidence label is based on at least one of the following: a frequency content of said lightning strike information included in said strike matrix; a difference between a maximum and minimum strike amplitude in said lightning strike information included in said strike matrix; and a standard deviation of strike bearing data in said lightning strike information included in said strike matrix.

13. The system in accordance with claim 2, wherein said means for identifying and locating comprises cell matrix means for maintaining a cell matrix for each of said groups representative of active thunderstorm cells, each of said cell matrices having stored therein information based on said lightning strike information in said corresponding group.

14. The system in accordance with claim 1, further comprising means for monitoring activity in said active thunderstorm cells based on contents of said cell matrices.

15. A thunderstorm cell detection and mapping system, comprising:
   means for acquiring lightning strike data relating to locations of respective lightning strikes;
   strike matrix means for grouping said lightning strikes into a plurality of groups based on said lightning strike data, and for each of said groups forming a strike matrix including strike matrix data representative of said lightning strikes included in said group;
   cell matrix means for forming a plurality of cell matrices, each cell matrix being representative of an active thunderstorm cell and including cell matrix data representative of lightning strikes associated with said active thunderstorm cell;
   matching means for attempting to match each of said strike matrices with one of said cell matrices according to a predetermined criteria, and if said match is successful, for associating said lightning strikes represented by said strike matrix with said matching cell matrix; and
   means for estimating locations for each of said active thunderstorm cells based on said cell matrix data included in said respective cell matrices.

16. The system in accordance with claim 15, further comprising:
   means for developing a confidence label for each of said strike matrices, said confidence label being indicative of an expected location of said lightning strikes represented by said corresponding strike matrix relative to a system origin; and
   wherein said predetermined criteria is based on said confidence label for said corresponding strike matrix.

17. The system in accordance with claim 16, further comprising:
   means for developing a cell matrix label for each of said cell matrices, said cell matrix label being indicative of an expected location of said active thunderstorm cell represented by said cell matrix; and
   wherein said predetermined criteria is further based on said respective cell matrix labels.

18. The system in accordance with claim 16, wherein each of said confidence labels is based on at least one of the following: a frequency content of said lightning strike information included in said strike matrix; a difference between a maximum and minimum strike amplitude in said lightning strike information included in said strike matrix; and a standard deviation of strike bearing data in said lightning strike information included in said strike matrix.

19. The system in accordance with claim 15, further comprising:
   means for creating a new cell matrix representing a new active thunderstorm cell in the event a strike matrix is not matched by said matching means to an existing cell matrix and said strike matrix meets another predetermined criteria for forming a new cell matrix.

20. The system in accordance with claim 19, wherein said another predetermined criteria for forming a new cell matrix is based on whether said strike matrix represents at least two lightning strikes originating from a common flash.

21. The system in accordance with claim 15, wherein said strike matrices and said cell matrices each include bearing data corresponding to the bearing of said lightning strikes associated therewith, and said matching means matches said strike matrices with said cell matrices based on a comparison of said bearing data.

22. The system in accordance with claim 15, wherein said strike matrices and said cell matrices each include amplitude data corresponding to the amplitude of said lightning strikes associated therewith, and said matching means matches said strike matrices with said cell matrices based on a comparison of said amplitude data.

23. The system in accordance with claim 15, wherein said strike matrices and said cell matrices each include frequency component data corresponding to the frequency components of said lightning strikes associated therewith, and said matching means matches said strike matrices with said cell matrices based on a comparison of said frequency component data.

24. The system in accordance with claim 15, wherein at least some of said strike matrices each represent a plurality of said lightning strikes originating from a common flash.

25. The system in accordance with claim 15, further comprising display means for displaying said estimated locations.

26. The system in accordance with claim 15, further comprising means for merging a plurality of said cell matrices into a common cell matrix representing a single active thunderstorm cell based on a predetermined merging criteria.

27. The system in accordance with claim 15, further comprising means for monitoring activity in said active thunderstorm cells represented by said cell matrices, and for determining if said active thunderstorm cells continue to remain active based on a predetermined activity criteria.

28. A thunderstorm cell detection and mapping system, comprising:
   means for receiving signals related to locations of lightning strikes;
   means for processing said signals to detect lightning flashes occurring among said lightning strikes; and
   automated means for estimating locations of different active thunderstorm cells including multiple lightning flashes based on said detected lightning flashes and a predetermined relationship among parameters associated with lightning flashes within a thunderstorm cell.

29. The system in accordance with claim 28, wherein said means for processing detects said lightning flashes based on an occurrence of a plurality of said lightning strikes within a predetermined time period and bearing location with respect to each other as determined from said signals.

30. A system for identifying a merger of a plurality of active thunderstorm cells, comprising:
   means for acquiring lightning strike data representative of respective lightning strikes;

automated means for processing said lightning strike data to obtain data representative of locations of respective active thunderstorm cells;

means for comparing said data representative of said location of one of said active thunderstorm cells with said data representative of said location of another of said active thunderstorm cells according to a predetermined criteria; and automated means for identifying said one active thunderstorm cell and said another active thunderstorm cell as being part of a same active thunderstorm cell based on said comparison.

31. The system in accordance with claim 30, wherein said predetermined criteria is based on a statistical analysis of said data representative of said location of said one active thunderstorm cell and said data representative of said location of said another active thunderstorm cell.

32. A thunderstorm cell detection and mapping system with invalid data rejection capabilities, comprising:

means for receiving lightning strike data representative of a detected lightning strike;

automated means for associating said detected lightning strike with an existing active thunderstorm cell in the event a first predetermined criteria is satisfied, said first predetermined criteria being based on a comparison of said lightning strike data representative of said detected lightning strike with other lightning strike data representative of lightning strikes previously associated with said active thunderstorm cell;

automated means for associating said detected lightning strike with a new active thunderstorm cell in the event a second predetermined criteria is satisfied; and means for rejecting said lightning strike data representative of said detected lightning strike as being invalid in the event neither said first nor second criteria is satisfied.

* * * * *